US012670814B2

(12) United States Patent
Donato et al.

(10) Patent No.: US 12,670,814 B2
(45) Date of Patent: Jun. 30, 2026

(54) PROGRESSIVE DISPLAY IN MULTI-ZOOM DIGITAL MAP

(71) Applicant: Apple Inc., Cupertino, CA (US)

(72) Inventors: Gianluca Donato, Los Altos, CA (US); Bradley Herried, Bentonville, AR (US); Dawit Y. Seid, Pleasanton, CA (US); Edward L. Pernicka, Redwood City, CA (US); Madhuwanti A. Vaidya, San Jose, CA (US); Michael J. Foster, Sunnyvale, CA (US); Ralph E. Lemke, Sunnyvale, CA (US); Ryan P. Crowther, Brooklyn, NY (US); Surya Prasad Bokam, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 18/328,694

(22) Filed: Jun. 2, 2023

(65) Prior Publication Data

US 2023/0394991 A1 Dec. 7, 2023

Related U.S. Application Data

(60) Provisional application No. 63/348,931, filed on Jun. 3, 2022.

(51) Int. Cl.
*G09B 29/00* (2006.01)
*G06V 20/70* (2022.01)
*G09B 29/10* (2006.01)
(52) U.S. Cl.
CPC ........... *G09B 29/005* (2013.01); *G06V 20/70* (2022.01); *G09B 29/106* (2013.01)

(58) Field of Classification Search
CPC .. G09B 29/003; G09B 29/005; G09B 29/106; G06V 20/70
See application file for complete search history.

(56) References Cited

U.S. PATENT DOCUMENTS

| | | | |
|---|---|---|---|
| 8,896,630 B1 * | 11/2014 | Miller | G06T 11/20 |
| | | | 345/636 |
| 2009/0181650 A1 | 7/2009 | Dicke | |
| 2014/0049564 A1 * | 2/2014 | Borger | G06T 11/20 |
| | | | 345/522 |
| 2015/0187337 A1 * | 7/2015 | Baxter | G01C 21/3673 |
| | | | 345/660 |
| 2016/0070984 A1 | 3/2016 | Watts et al. | |
| 2016/0169700 A1 | 6/2016 | Goddard | |

(Continued)

OTHER PUBLICATIONS

Deepali et al., "Normalization based K means Clustering Algorithm", Mar. 3, 2015 (Year: 2015).*

(Continued)

*Primary Examiner* — Kee M Tung
*Assistant Examiner* — Thang Gia Huynh
(74) *Attorney, Agent, or Firm* — Kilpatrick Townsend & Stockton LLP

(57) ABSTRACT

The present application relates to devices and components including apparatus, systems, and methods to determine information to be displayed within a display of a map. For example, the apparatus, systems, and methods can determine which settlements, labels, and/or roads are to be displayed within a display of a map based on a current zoom level of the display of the map, among other factors.

18 Claims, 17 Drawing Sheets

(56) References Cited

U.S. PATENT DOCUMENTS

| | | | |
|---|---|---|---|
| 2019/0221047 A1* | 7/2019 | Adlers | .................... G06T 11/00 |
| 2020/0278962 A1 | 9/2020 | Vasilyev et al. | |

OTHER PUBLICATIONS

Peterson, Micheal, "A Comparison of Feature Density for Large Scale Online Maps," Cartographic Perspectives, No. 97, Apr. 26, 2021, https://cartographicperspectives.org/index.php/journal/article/view/1707/1995, 17 pages.

Kern, Jill Phelps, "Automation and the Map Label Placement Problem: A Comparison of Two GIS Implementations of Label Placement," Cartographic Perspectives, No. 60, Jun. 1, 2008, https://cartographicperspectives.org/index.php/journal/article/view/cp60-kern-brewer/pdf, 24 pages.

Laurent, Maxence, "From Point Feature Label Placement to Map Labelling," MIC 2009: The VIII Metaheuristics International Conference, Jul. 13-16, 2009, https://citeseerx.ist.psu.edu/viewdoc/download?doi=10.1.1.472.4491&rep=rep1&type=pdf, 12 pages.

* cited by examiner

100

102　Identify a Hub

104　Identify Settlement Candidates for Label Display at a Second Zoom Level

106　Determine Proximal and Non-proximal Settlement Candidates

108　Determine Rivals from the Settlement Candidates

110　Determine Additional Settlements to have Labels Displayed at the Second Zoom Level 112　Cause the Labels to be Displayed at the Second Zoom Level

300

302 — Determine a Type of Each Settlement

304 — Retrieve Characteristics for the Settlements

306 — Determine Scores for the Settlements based at least in part on the Characteristics 308 — Determine Rankings for the Settlements 310 — Assign Initial Zoom Levels for Label Display to the Settlements 312 — De-densify Labels for the Settlements

416

Table

| X | C | Z | B | A | Y | D |

418

Table 1

| C | B | A | X | Z | Y | D |

Area = 21
Trace = 3000

Area = 22
Trace = 3100

414

Area = 30
Trace = 3100

412

Y

Z

X

410

Area = 460
Trace = 3000

Area = 180
Trace = 3200

A

C

406

402

408

Area = 260
Trace = 3100

B

Area = 15
Trace = 3000

404

400

700

702 — Determine a Zoom Level for a Map Display

704 — Determine an Area to be Displayed in the Map Display

706 — Determine Settlements within the Area to be Displayed

708 — Determine Settlement Pairs from the Settlements

710 — Determine Roads to Connect the Settlement Pairs

712 — Cause the Map to be Displayed

900

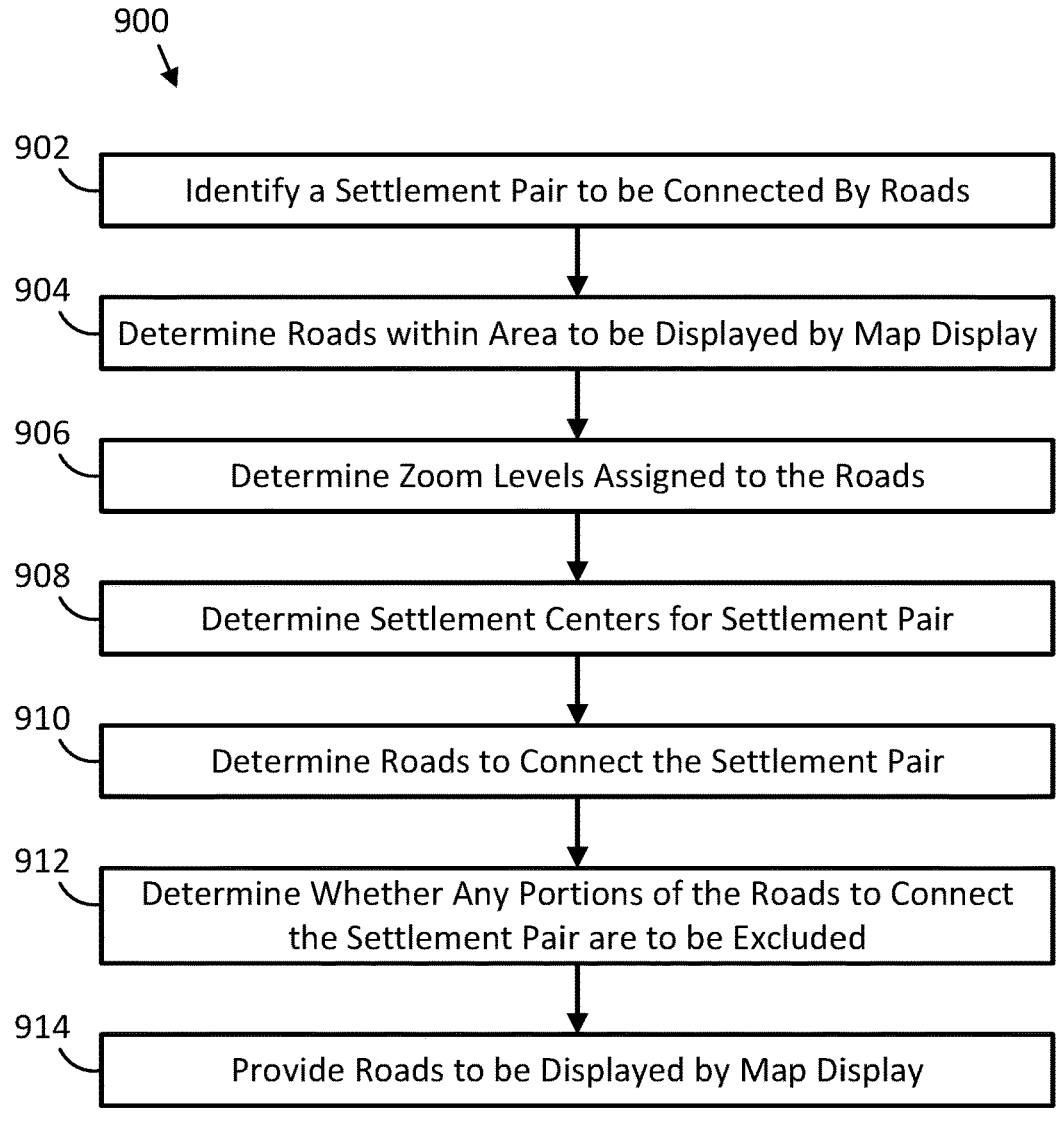

902 — Identify a Settlement Pair to be Connected By Roads

904 — Determine Roads within Area to be Displayed by Map Display

906 — Determine Zoom Levels Assigned to the Roads

908 — Determine Settlement Centers for Settlement Pair

910 — Determine Roads to Connect the Settlement Pair

912 — Determine Whether Any Portions of the Roads to Connect the Settlement Pair are to be Excluded 914 — Provide Roads to be Displayed by Map Display

FIG. 9

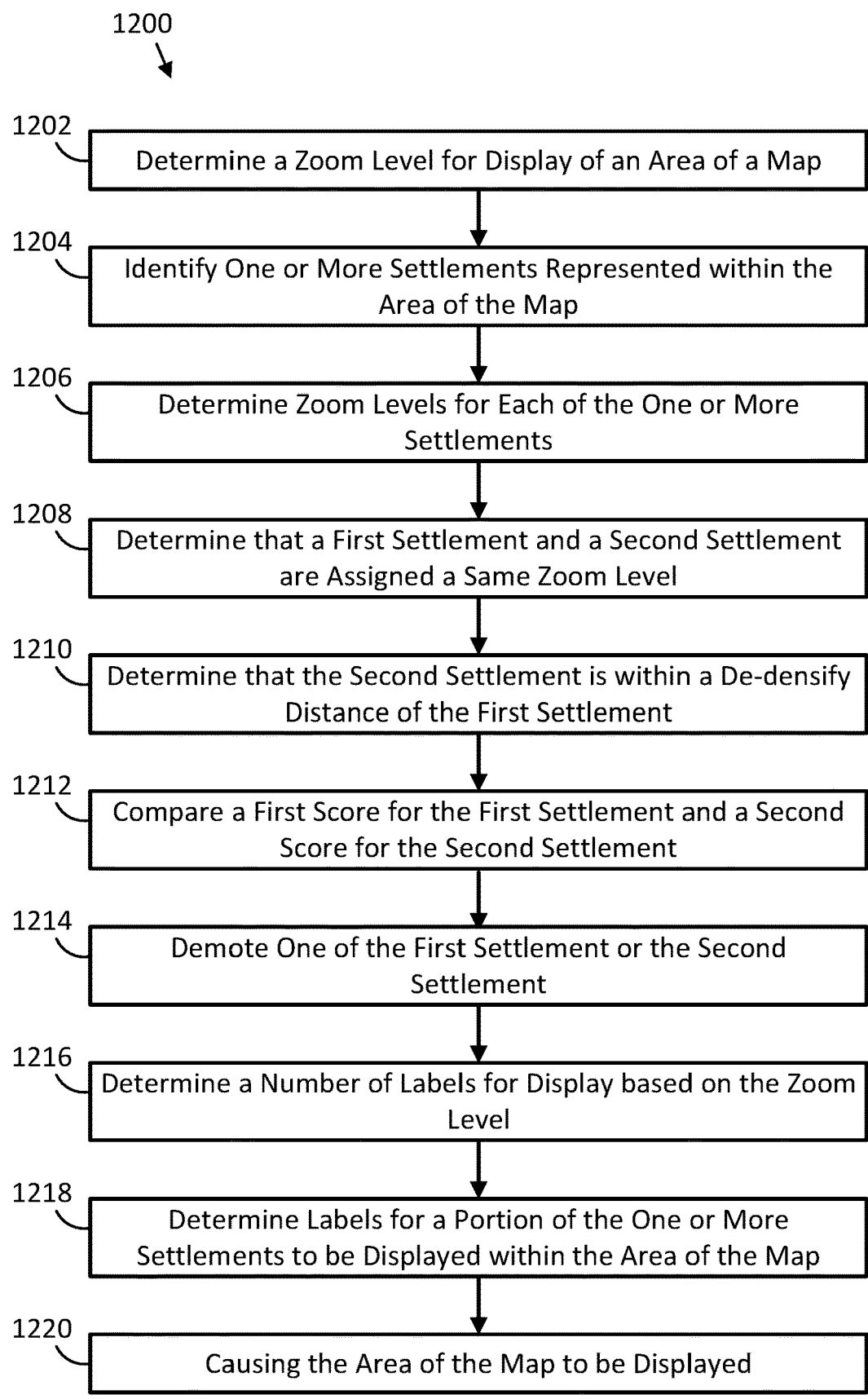

1200

1202 — Determine a Zoom Level for Display of an Area of a Map

1204 — Identify One or More Settlements Represented within the Area of the Map

1206 — Determine Zoom Levels for Each of the One or More Settlements

1208 — Determine that a First Settlement and a Second Settlement are Assigned a Same Zoom Level 1210 — Determine that the Second Settlement is within a De-densify Distance of the First Settlement 1212 — Compare a First Score for the First Settlement and a Second Score for the Second Settlement 1214 — Demote One of the First Settlement or the Second Settlement 1216 — Determine a Number of Labels for Display based on the Zoom Level 1218 — Determine Labels for a Portion of the One or More Settlements to be Displayed within the Area of the Map 1220 — Causing the Area of the Map to be Displayed

FIG. 12

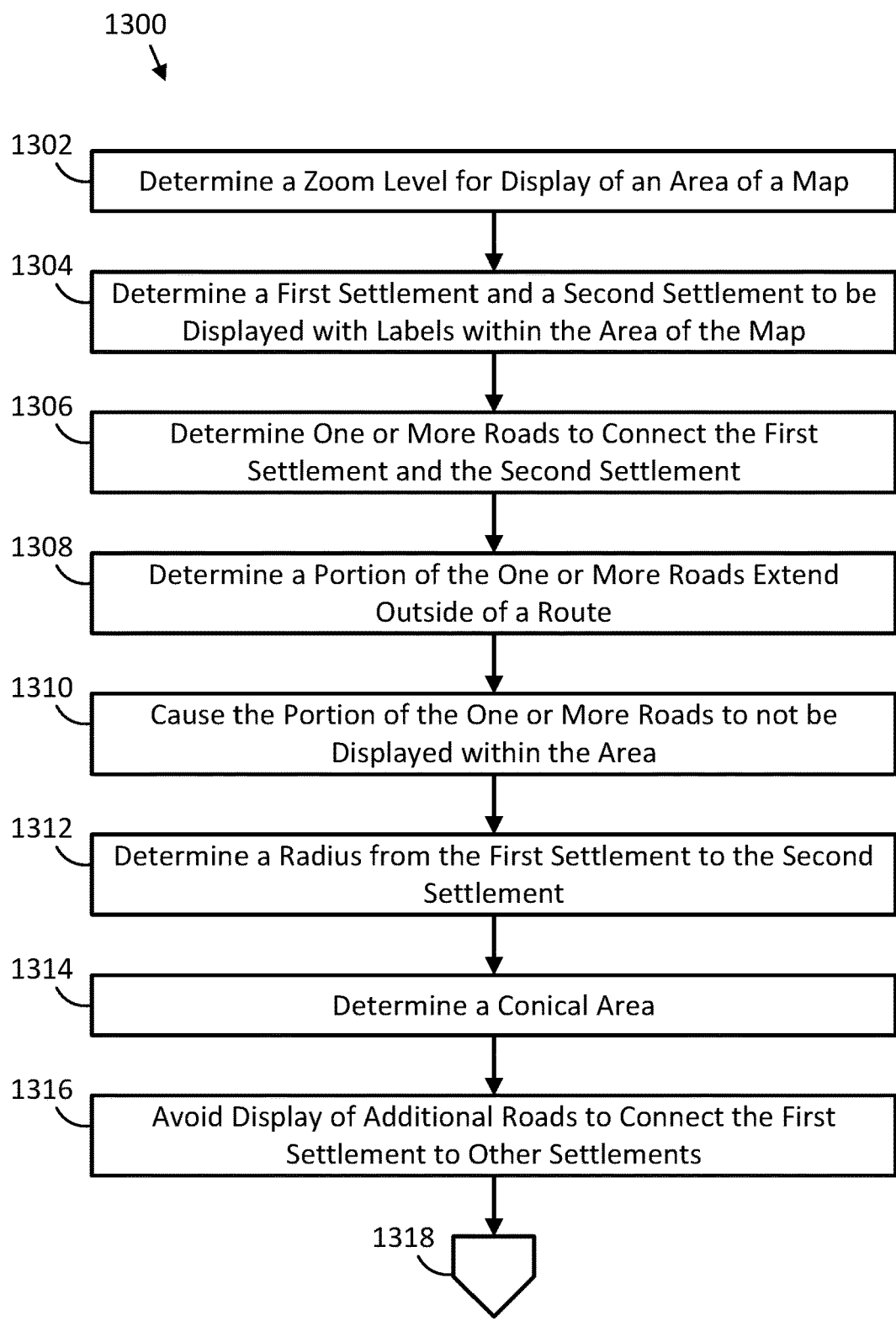

1300

1302 Determine a Zoom Level for Display of an Area of a Map

1304 Determine a First Settlement and a Second Settlement to be Displayed with Labels within the Area of the Map 1306 Determine One or More Roads to Connect the First Settlement and the Second Settlement 1308 Determine a Portion of the One or More Roads Extend Outside of a Route 1310 Cause the Portion of the One or More Roads to not be Displayed within the Area 1312 Determine a Radius from the First Settlement to the Second Settlement 1314 Determine a Conical Area 1316 Avoid Display of Additional Roads to Connect the First Settlement to Other Settlements

1402 — Identify a Third Settlement within the Conical Area

1404 — Determine a Second Group of One or More Roads to Connect the First Settlement and the Third Settlement 1406 — Cause the Area of the Map to be Displayed with the One or More Roads

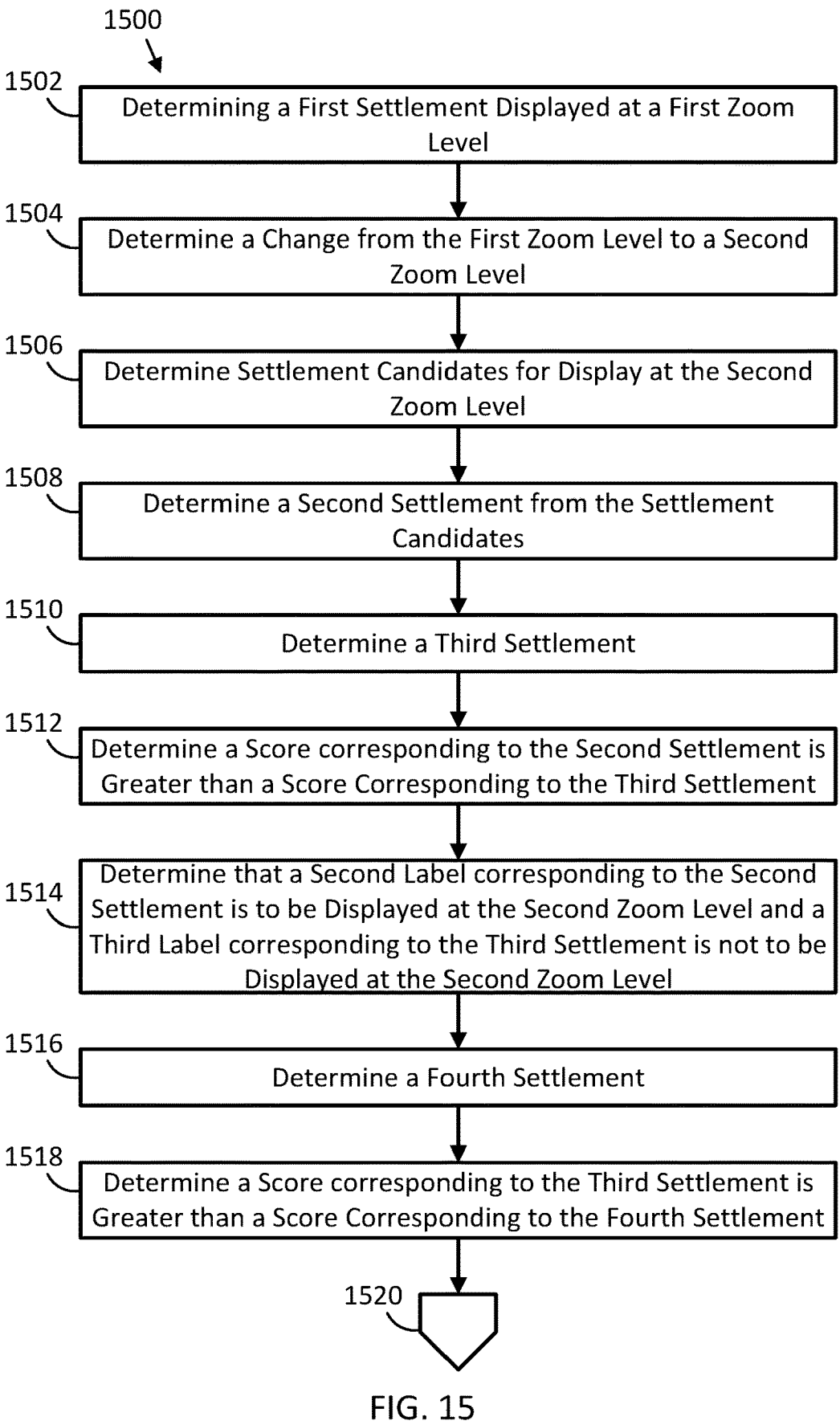

1500

1502  Determining a First Settlement Displayed at a First Zoom Level

1504  Determine a Change from the First Zoom Level to a Second Zoom Level

1506  Determine Settlement Candidates for Display at the Second Zoom Level

1508  Determine a Second Settlement from the Settlement Candidates

1510  Determine a Third Settlement

1512  Determine a Score corresponding to the Second Settlement is Greater than a Score Corresponding to the Third Settlement 1514  Determine that a Second Label corresponding to the Second Settlement is to be Displayed at the Second Zoom Level and a Third Label corresponding to the Third Settlement is not to be Displayed at the Second Zoom Level 1516  Determine a Fourth Settlement 1518  Determine a Score corresponding to the Third Settlement is Greater than a Score Corresponding to the Fourth Settlement

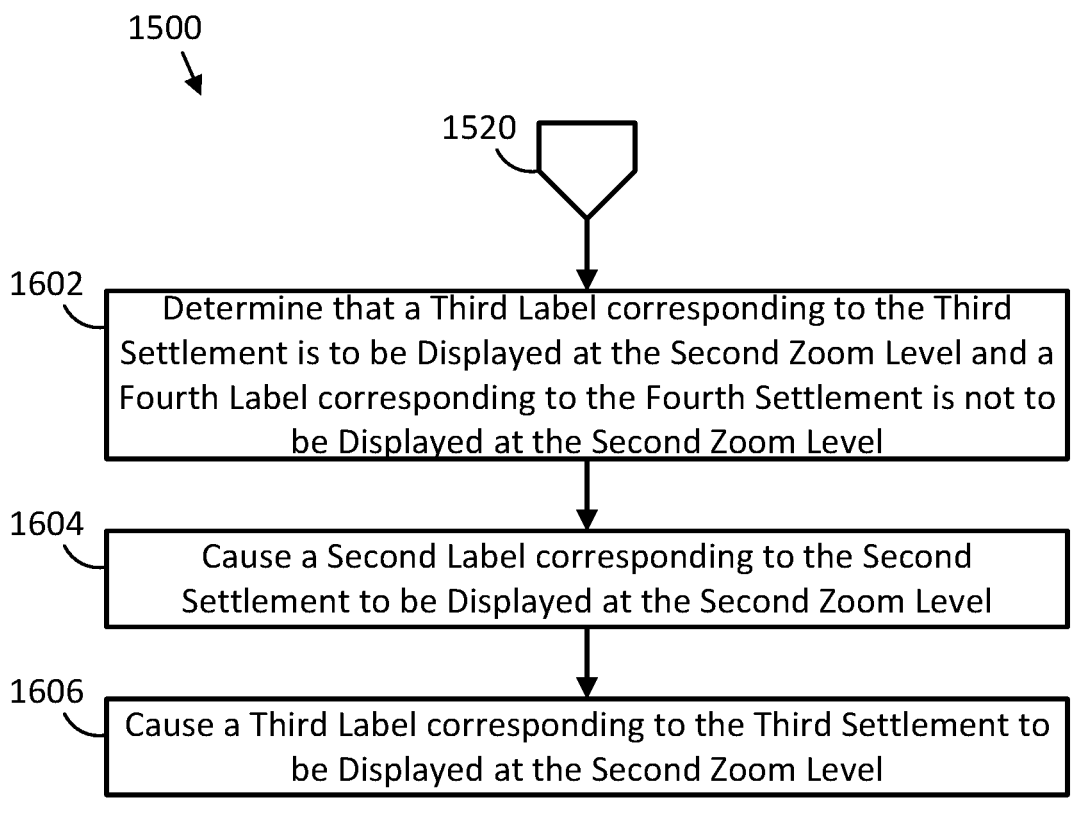

1500

1520

1602 Determine that a Third Label corresponding to the Third Settlement is to be Displayed at the Second Zoom Level and a Fourth Label corresponding to the Fourth Settlement is not to be Displayed at the Second Zoom Level 1604 Cause a Second Label corresponding to the Second Settlement to be Displayed at the Second Zoom Level 1606 Cause a Third Label corresponding to the Third Settlement to be Displayed at the Second Zoom Level

FIG. 16

PROGRESSIVE DISPLAY IN MULTI-ZOOM DIGITAL MAP

CROSS-REFERENCE TO RELATED APPLICATIONS

This application claims priority to U.S. provisional application No. 63/348,931, entitled "Progressive Display in Multi-zoom Digital Map", filed on Jun. 3, 2022, the disclosure of which is incorporated by reference herein in its entirety for all purposes.

BACKGROUND

Historically, determining what to display within a map was a challenging job for a cartographer. In particular, the cartographer would need to consider the size of the map and an area represented by the map. The cartographer would need to determine which cities, roads, and/or other features (which may collectively be referred to as information) to show in the map. Often, the cartographer would need to determine a visually pleasing and/or useful display of information within the map while displaying the information for the purpose of the map. Accordingly, the cartographer would determine which portions of the information to display in the display of the map and which portions of the information to omit in the display of the map.

The development of digital maps has allowed for quick display of maps. Further, the digital maps often provide for dynamic changes in the map displayed, such as allowing dynamic zooming and/or dynamic changing of area to be displayed by the map. The system displaying the digital map may determine what information is to be displayed, e.g., by using predefined algorithms.

BRIEF DESCRIPTION OF THE DRAWINGS

FIG. 9 illustrates an example process for determining roads for a settlement pair in accordance with some embodiments.

FIG. 12 illustrates an example process for causing an area of a map to be displayed in accordance with some embodiments.

FIG. 13 illustrates a first portion of a process for determining roads to be displayed in a map in accordance with some embodiments.

FIG. 15 illustrates a first portion of an example process in accordance with some embodiments.

FIG. 16 illustrates a second portion of the example process of FIG. 15 in accordance with some embodiments.

SUMMARY

Figure 1:
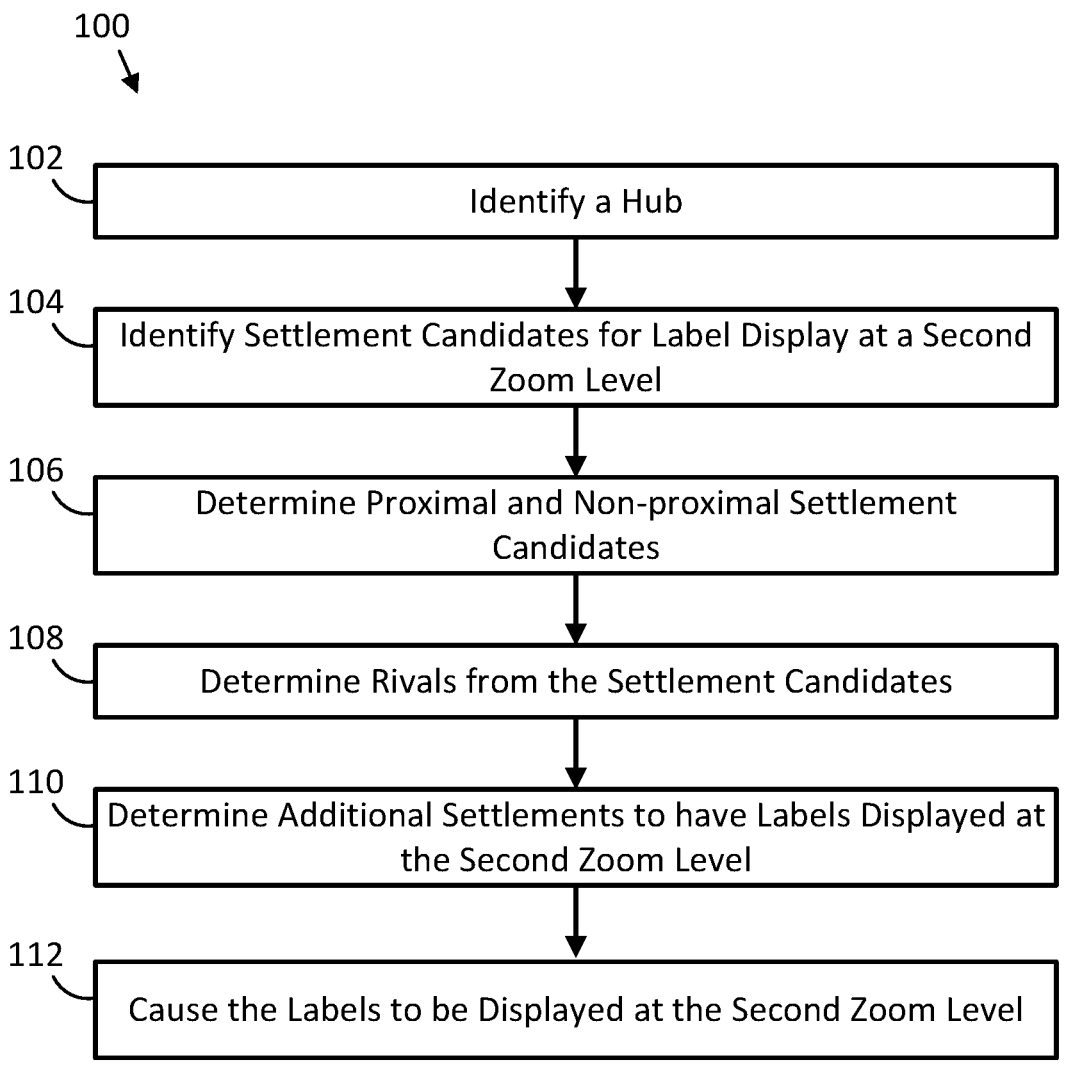
FIG. 1 illustrates an example process for proximity-based label selection in accordance with some embodiments.

Various embodiments related to apparatus, systems, and methods to determine information to be displayed within a display of a map are disclosed herein. In some embodiments, a computer-implemented method may include determining, by a system, a zoom level for display of an area of a map. The method may further include identifying, by the system, one or more settlements represented within the area of the map, and determining, by the system, zoom levels for each of the one or more settlements based at least in part on settlement properties associated with the one or more settlements. Further, the method may include determining, by the system, labels for a portion of the one or more settlements to be displayed within the area of the map based at least in part on the zoom level for the display and the zoom levels for each of the one or more settlements, and causing, by the system, the area of the map to be displayed with the portion of the labels for the one or more settlements.

In some embodiments, a computer-implemented method may include determining, by a system, a zoom level for display of an area of a map. The method may further include determining, by the system, a first settlement and a second settlement to be displayed with labels within the area of the map, and determining, by the system, one or more roads to connect the first settlement and the second settlement based at least in part on the zoom level. Further, the method may include causing, by the system, the area of the map to be displayed with the one or more roads connecting the first settlement and the second settlement.

In some embodiments, a computer-implemented method may include determining, by a system, a first settlement having a corresponding first label displayed at a first zoom level of a display of an area of a map, and determining, by the system, a change from the first zoom level to a second zoom level, the second zoom level being a higher zoom level than the first zoom level. The method may further include determining, by the system, settlement candidates for the display at the second zoom level that do not have labels displayed at the first zoom level based at least in part on populations of the settlement candidates or search popularity scores for the settlement candidates, and determining, by the system, a second settlement from the settlement candidates, the second settlement located within a proximity of the first settlement. Further, the method may include causing, by the system, a second label corresponding to the second settlement to be displayed at the second zoom level based at least in part on the second settlement being located within the proximity of the first settlement.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Examples of the present disclosure are directed to, among other things, methods, system, devices, and computer-readable media (e.g., described technology and/or described techniques) for determining information to be displayed in a map display. In some examples, the approaches may include determining settlements (such as cities and/or neighborhoods) and/or roads to be displayed in a map display. The described approaches may display information that is determined to be useful and/or popular while omitting other information that may not be as useful and/or beneficial. The described technology may provide for easier interpretation of information presented on a map while including useful and/or popular information within the map display.

Turning to a first particular example, a system that analyzes parameters for labels of settlements to be displayed within a map display. The system may determine scores for each of the settlements based on the corresponding parameters. Defined weightings may be applied to each of the parameters to produce the scores for the settlements. In some embodiments, the scores may be normalized based on the locations of the settlement, such as by grouping the settlements into clusters based on locations of the settlements and normalizing the scores by the settlements. The system may assign zoom levels to the settlements based on the scores. The system may determine an area to be displayed within a map display and a zoom level for the map display. The system may determine the settlements to have corresponding labels displayed within the map display. The system may cause the settlements to be displayed with the determined corresponding labels within the map display.

Turning to a second particular example, a system may determine settlements to have corresponding labels displayed within a map display based on proximity to other settlements. For example, the system may identify a first settlement that has a corresponding label displayed in a first zoom level of the map. The first settlement may have been defined to be displayed at the first zoom level based on curation information provided by a cartographer or another authorized user. The first settlement may be treated as a hub for determining one or more settlements to be displayed in the map display at a second zoom level, where the second zoom level is zoomed in as compared to the first settlement. The system may determine a proximity around the first settlement. The system may determine settlements to have corresponding labels to be displayed in the second zoom level based on the relation to the proximity around the first settlement. The system may identify settlements located within the proximity and settlements located outside of the proximity. For the determined settlements, the system may determine whether rival settlements are located with a proximity of a settlement, where the proximity of a settlement may depend on whether the settlement is located within or outside of the proximity around the first settlement. In the case where rivals are identified, the system may determine the one settlement of the rivals to have corresponding labels displayed within the second zoom level. Accordingly, the system may determine settlements to have corresponding labels displayed within the second zoom level based on the proximity to the first settlement having the corresponding label displayed at the first zoom level.

Turning to a third particular example, a system may determine roads to be displayed within a map display. The system may determine roads to be displayed within the map display based on parameters of the roads, zoom levels associated with the roads, a zoom level of the map display, settlements with labels being displayed within the map display at the zoom level, or some combination thereof. For example, the system may determine one or more roads available for display at the zoom level of the map display based on the zoom levels of the roads. The system may further determine settlement pairs having a first settlement and a second settlement. The system may determine roads from the one or more roads available that connect the first settlement and the second settlement of the settlement pair, which may form one or more of the routes between the first settlement and the second settlement. The system may determine roads to be displayed within the map from one or more of the routes formed between the first settlement and the second settlement.

Legacy approaches for displaying digital maps could, at times, result in poor representations of information within digital maps. For example, in determining which information to display within digital maps, the legacy system may have limited data available and/or may utilize limited data to determine what information to display within the digital map. This can result in useful information being left out of the display of the digital map, too much information to be displayed within the digital map for effective visual interpretation by a user, or other inefficient presentation of information within the digital map.

Approaches herein can provide effective presentation of information in a digital map. For example, the approaches described herein may utilize popularity of information to determine which information to display within the digital maps in some embodiments, where the popularity may result in useful information being displayed where it may not be displayed in other legacy approaches. In some embodiments, the approaches may utilize information from cartographers, or other authorized users, in combination with other information to determine information to display within the digital map. The other approaches described herein may provide for effective presentation of information within digital maps.

As an example, some approaches described herein may determine which portion of labels are to be displayed on a digital map. In particular, there can be large amounts of labels for settlements within an area to be displayed on a digital map in some instances. In legacy approaches, systems display all the labels located in an area, which results in the labels being illegible, such as due to the labels overlapping and/or the text of the labels being too small to read.

The approaches described herein can determine a portion of the labels to be displayed based on a zoom level of the digital map. For example, the system may determine a zoom level for a digital map to be rendered by a device. The system may determine weighted scores for settlements located in an area to be represented by the digital based on information provided related to the settlements, such as geo-search popularities. The weighted scores can be locality of the area to be represented by the digital map. An initial determination of which settlements are to be displayed with labels at which zoom levels may be made based on the weighted scores. The system may further perform a densification procedure by which the system can limit the settlements with labels displayed at a zoom level to verify that labels for settlements do not overlap. By limiting the labels to be displayed on the digital map, approaches described herein can present labels on the digital map in a legible manner with no labels overlapping and a size of the text being of an adequate size for reading. The approaches may utilize geo-search popularities to determine which labels to be presented, which results in the limited labels being displayed on the digital map being for settlements that are popular to users.

As another example, some approaches described herein may efficiently determine which roads are to be displayed on a digital map. In legacy approaches, roads displayed within a digital map were often selected based on the size of the roads or a zoom level of the digital map without further considerations. This could result in settlements displayed on the digital map without connecting roads. This could be highly inconvenient to a user trying to travel from one settlement to another.

Approaches described herein may identify settlements to be displayed with labels within the digital map and may display roads connecting the settlements. For example, the system may determine settlement pairs to be connected by roads based on distances between settlements to be displayed within the displayed in the digital map, settlement density around the settlements, and/or region in which the settlements are located. The system may further determine zoom levels assigned to identified roads and a zoom level for the display of the digital map. Based on the zoom levels of the roads and the zoom level of the display of the digital map, the system may determine roads determined to be available to be displayed at the zoom level of the digital map. From the roads determined to be available, the system may display roads that connect the settlement pairs. In some instances, the system may further suppress display of portions of the roads that end at a location other than a settlement. Having roads displayed that connect the settlements may be more useful for users as the users can determine a route between the settlements, which may not have been available in some instances with the legacy approaches.

As another example, some approaches described herein may determine which settlements are to have labels displayed when a zoom level of the digital map is changed based on proximity to other settlements with labels displayed at a lower zoom level. In legacy approaches, as the zoom levels of digital maps were changed, the systems would determine which labels were to be added for the zoom level change based solely on predefined zoom levels assigned to the labels and/or settlements and without consideration for other settlements with labels to be displayed. In some instances, this can result in settlements with labels to be displayed at a zoom level being relatively far apart. However, it can be preferable for users to have settlements that are near each other to have labels displayed so the users can see what settlements are near the settlements displayed in a current zoom level when the zoom level is increased.

Approaches described herein can determine additional settlements to have labels displayed as the zoom level is increased based on the proximity of the additional settlements to the settlements having labels displayed at a current zoom level. For example, the system can identify a change from a first zoom level to a second zoom level of a display of a digital map. The system can identify one or more settlement candidates that do not have labels displayed at the first zoom level. The system can determine, from the one or more settlement candidates, settlement candidates that are located within a proximity of a settlement having a label displayed at the first zoom level. The system can determine scores for the settlement candidates based on characteristics of the settlement candidates, such as the populations of the settlement candidates and/or the search popularity of the settlement candidates. The system can determine which additional settlements are to have labels displayed at the second zoom level based on the determined scores for the settlement candidates. This can cause settlement that are relatively close together to have labels displayed on a digital map, which can be preferable to users.

Proximity-Based Label Selection

In some approaches, systems described herein may implement a proximity-based approach to determine which labels are to be displayed at certain zoom levels. For example, a label for a settlement may be displayed within a map at a first zoom level. The display of the map may be changed to a second zoom level, where second zoom level may be zoomed in as compared to the first zoom level. Additional settlements to be labeled at the second zoom level may be determined based on the proximity of the additional settlements to the settlement with the label displayed at the first zoom level.

Figure 2:
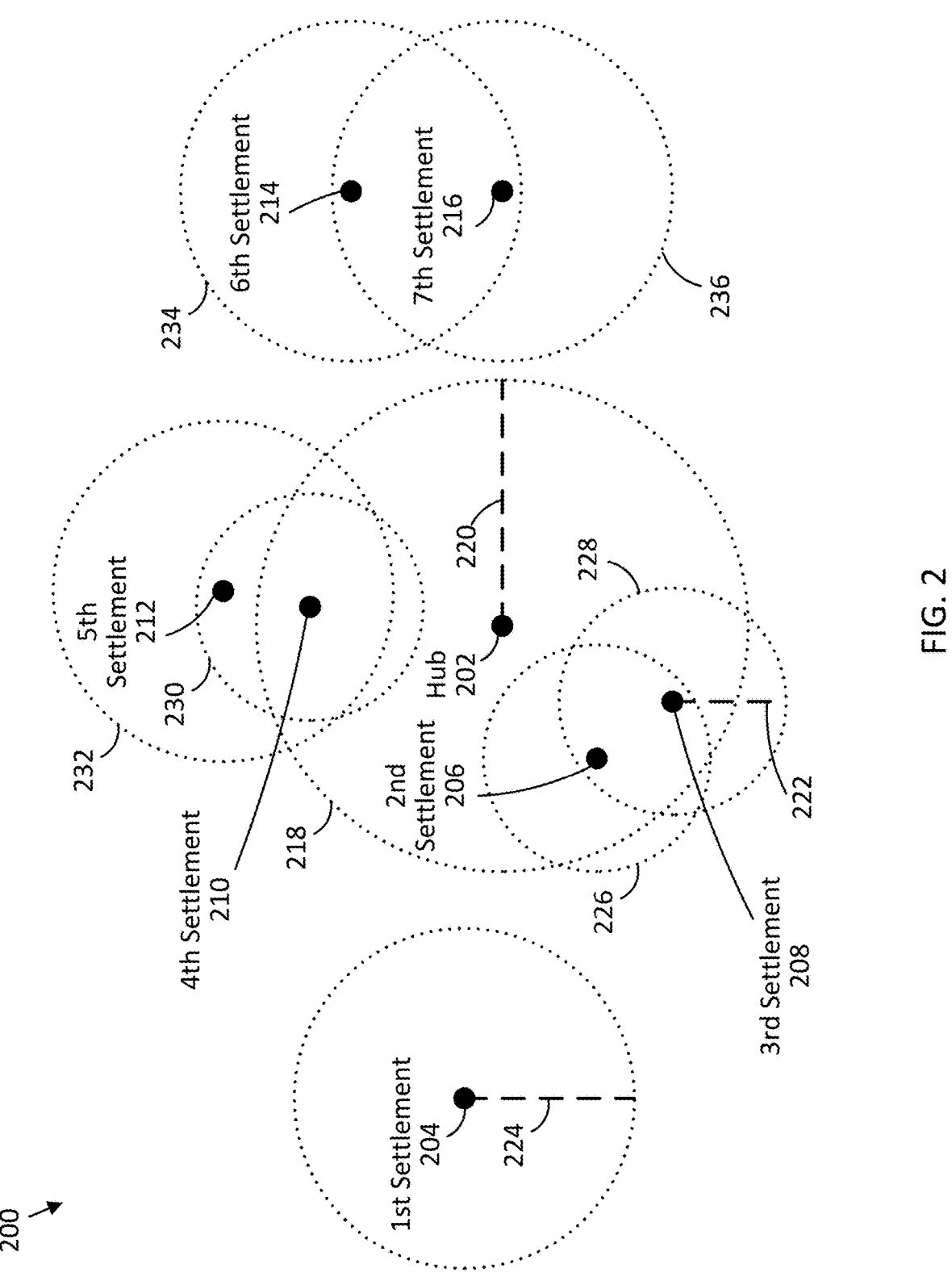
FIG. 2 illustrates an example settlement arrangement showing proximity-based label selection in accordance with some embodiments.

FIG. 1 illustrates an example process 100 for proximity-based label selection in accordance with some embodiments. FIG. 2 illustrates an example settlement arrangement 200 showing proximity-based label selection in accordance with some embodiments. For example, a system (such as the system 1716 (FIG. 17)) may perform the process 100 to select settlements for which labels are to be displayed at a zoom level.

FIGS. 1, 3, 7, 9, 12, 13, 14, 15, and 16 illustrate example flow diagrams showing processes 100, 300, 700, 900, 1200, 1300, and 1500, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

At block 102, the process 100 includes the system identifying a hub. The hub may be a settlement with a label displayed in a first zoom level of a display of a map. In some embodiments, the settlement may be displayed in the first zoom level based on curation information. The curation information may include an indication from a cartographer, or other authorized user, that the settlement is to be displayed in the first zoom level. In these embodiments, the system may identify the settlement as the hub based on the indication from the cartographer. In some instances, the system may identify the hub on an importance of the settlement and/or a score corresponding to the settlement.

The settlement arrangement 200 may include a hub 202. The hub 202 may be a settlement that had a corresponding label displayed at a first zoom level. The settlement may have been determined as the 202 based on the indication from the cartographer or other information in some embodiments.

At block 104, the process 100 includes the system identifying settlement candidates for label display at a second zoom level. The second zoom level may be a zoom level contiguous to the first zoom level, where the second zoom level is zoomed in from the first zoom level. The settlement candidates may include settlements that did not have labels displayed at the first zoom level display of the map. Further, the settlement candidates may include settlements with characteristics corresponding to the second zoom level. For example, the second zoom level may have one or more thresholds for settlements to have a label displayed at the second zoom level. For example, settlements to be candidates for display at the second zoom level may exceed a threshold population, exceed a threshold area, exceed a threshold of another characteristic related to settlements, exceed a threshold score (scores being determined on one or more characteristics related to settlements, such as a search popularity score related to the settlement), or some combination thereof. The system may determine one or more settlements located within an area to be displayed within a map at the second zoom level and having labels that were not displayed at the first zoom level. From the one or more settlements, the system may determine settlements that exceed the one or more defined thresholds and treat the settlements as settlement candidates for labels to be displayed at the second zoom level.

The settlement arrangement 200 may include one or more settlements that qualify as settlement candidates. The settlements may have characteristics that exceed the thresholds for label display at the second zoom level. In the illustrated embodiment, the settlement arrangement 200 includes a first settlement 204, a second settlement 206, a third settlement 208, a fourth settlement 210, a fifth settlement 212, a sixth settlement 214, and a seventh settlement 216. Each of these settlements may be in an area to be displayed within the map at the second zoom level and may exceed the thresholds for display at the second zoom level.

At block 106, the process 100 includes the system determining proximal and non-proximal settlement candidates. For example, the hub may have a defined proximity around the hub that is utilized for determining which settlement candidates are proximal settlement candidates and which settlement candidates are non-proximal settlement candidates. Settlement candidates within the proximity defined around the hub may be proximal settlement candidates. Settlement candidates outside of the proximity defined around the hub may be non-proximal candidates. The system may determine which of the settlement candidates are within the proximity of the hub and which of the settlement candidates are outside of the proximity of the hub to determine the proximal settlement candidates and the non-proximal settlement candidates.

The hub 202 in the settlement arrangement 200 is defined with a proximity 218. The proximity 218 may encircle the hub 202 with the hub 202 being located at the center of the proximity. A radius 220 from the hub 202 may define the proximity 218. The radius 220 may be predefined, may be determined based on density of settlements around the hub 202, may be determined based on a zoom level (such as the second zoom level), or some combination thereof. The radius 220 may be defined as 15 kilometers (km) in the illustrated embodiment.

Proximal settlement candidates and non-proximal settlement candidates may be determined based on the proximity 218. In particular, settlements with the proximity 218 may be determined to be proximal settlement candidates. Settlements outside of the proximity 218 may be determined to be non-proximal settlement candidates. In the illustrated embodiment, the second settlement 206, the third settlement 208, and the fourth settlement 210 may be determined to be proximal settlement candidates based on being located within the proximity 218. The first settlement 204, the fifth settlement 212, the sixth settlement 214, and the seventh settlement 216 may be determined to be non-proximal settlement candidates.

At block 108, the process 100 includes the system determining rivals from the settlement candidates. For example, each of the settlement candidates may have a corresponding proximity, where other settlements located within the proximity of a settlement candidate may be a rival of the settlement candidate. The proximities of the proximal settlement candidates may be different from the proximities of the non-proximal settlement candidates. For example, the proximities of the proximal settlement candidates may be smaller than the proximities of the non-proximal settlement candidates. Having the proximities of the proximal settlement candidates be smaller than the proximities of the non-proximal settlement candidates may provide for greater density of labels within the proximity 218 of the hub 202 as compared to the density of labels outside of the proximity 218 of the hub 202. The system may analyze each of the settlement candidates to determine whether the settlement candidate has one or more rivals. The system may determine the rivals based on the settlements being within proximities of other settlements.

In the illustrated embodiment pertaining to a particular zoom level, the proximal settlement candidates may have proximities with a radius 222 and the non-proximal settlement candidates may have proximities with a radius 224. The radius 222 of the proximal settlement candidates may be smaller than the radius 220 of the hub 202 and the radius 224 of the non-proximal settlement candidates. In some embodiments, the radius 224 may be 8 km. The radius 224 of the non-proximal settlement candidates may be smaller than the radius 220 of the hub 202 and larger than the radius 222 of the proximal candidates. In some embodiments, the radius may be 12 km. Accordingly, the second settlement 206, the third settlement 208, and the fourth settlement 210 may have proximities with radius 222 in the illustrated embodiment. The first settlement 204, the fifth settlement 212, the sixth settlement 214, and the seventh settlement 216 may have proximities with radius 224.

In determining rivals, the system may determine that the second settlement 206 has a proximity 226 and the third settlement 208 has a proximity 228. The system may determine that the third settlement 208 is within the proximity 226 of the second settlement 206. Further, the system may determine that the second settlement 206 is within the proximity 228 of the third settlement 208. Based on the second settlement 206 being within the proximity 228 and/or the third settlement 208 being within the proximity 226, the system may determine that the second settlement 206 and the third settlement 208 are rivals.

Further, the system may determine that the fourth settlement 210 has a proximity 230 and the fifth settlement 212 has a proximity 232. The system may determine that the fifth settlement 212 is within the proximity 230 of the fourth settlement 210. Further, the system may determine that the fourth settlement 210 is within the proximity 232 of the fifth settlement 212. Based on the fourth settlement 210 being within the proximity 232 and/or the fifth settlement 212 being within the proximity 230, the system may determine that the fourth settlement 210 and the fifth settlement 212 are rivals.

The system may determine the sixth settlement 214 has a proximity 234 and the seventh settlement 216 has a proximity 236. The system may determine that the seventh settlement 216 is within the proximity 234 of the sixth settlement 214. Further, the system may determine that the sixth settlement 214 is within the proximity 236 of the seventh settlement 216. Based on the sixth settlement 214 being within the proximity 236 and/or the seventh settlement 216 within the proximity 234, the system may determine that the sixth settlement 214 and the seventh settlement 216 are rivals.

At block 110, the process includes the system determining additional settlements to have labels displayed at the second zoom level. In particular, the system may determine which settlements from the settlement candidates are to have labels displayed at the second zoom level in addition to the label for the hub. In instances where the system determines that a settlement candidate does not have rivals, the system may determine that the label for the settlement corresponding to the settlement candidate without rivals is to be displayed in the map at the second zoom level. In instances where the system determines that settlement candidates are rivals, the system may compare one or more characteristics of the settlements corresponding to the settlement candidates that are rivals. For example, the system may compare the characteristics of the settlements that were utilized to identify the settlements as the settlement candidates and determine which settlement is to have the corresponding label displayed based on the comparison. As one example, a first settlement and a second settlement may have been determined to be rivals. The system may compare a population of the first settlement with a population of the second settlement, and may determine that a label for the first settlement is to be displayed at the second zoom level based on the first settlement having a larger population than the second settlement. In some embodiments, where the determined rival includes a proximal settlement candidate and a non-proximal settlement candidate, the system may determine to provide preference to the proximal settlement candidate and display the label for the proximal settlement candidate at the second zoom level while the label for the non-proximal settlement candidate is determined not to be displayed at the second zoom level.

In the settlement arrangement 200, a label for the first settlement 204 may be determined to be displayed based on the first settlement 204 not having rivals. As the second settlement 206 and the third settlement 208 have been determined to be rivals, characteristics of the second settlement 206 and the third settlement 208 may be compared to determine which one of the second settlement 206 or the third settlement 208 is to have a label displayed at the second zoom level. Further, as the sixth settlement 214 and the seventh settlement 216 have been determined to be rivals, characteristics of the sixth settlement 214 and the seventh settlement 216 may be compared to determine which one of the sixth settlement 214 and the seventh settlement 216 is to have a label displayed at the second zoom level. Further, the fourth settlement 210 and the fifth settlement 212 may have been determined to be rivals. In some embodiments, characteristics of the fourth settlement 210 and the fifth settlement 212 may be compared to determine which one of the fourth settlement 210 and the fifth settlement 212 is to have a label displayed at the second zoom level. In some embodiments, the system may determine that the fourth settlement 210 is to have a label displayed at the second zoom level based on the fourth settlement 210 being a proximal settlement candidate and the fifth settlement 212 being a non-proximal settlement candidate.

At block 112, the process 100 includes the system causing the labels to be displayed at the second zoom level. For example, the system may cause the labels for the additional settlements determined in block 110 and the label for the hub to be displayed in the map when displayed at the second zoom level.

While the process 100 is described in a particular order and with particular elements, it should be understood that the order may be different in other embodiments, and/or may have one or more of the elements omitted in other embodiments. Further, one or more of the elements in the process 100 may be performed concurrently in other embodiments. The process 100 may be repeated for each zoom level of a multi-zoom map at which settlement labels are to be displayed to determine the labels for settlements to be displayed at each of the zoom levels.

Score-Based Zoom Level Determination

In some approaches, systems described herein may implement a score-based approach to determine which labels are to be displayed at which zoom levels. For example, the system may take in one or more characteristics as signals for a settlement and determine a score for the settlement based on the characteristics. The system may determine zoom levels at which the labels for each of the settlements is to be displayed based on the scores for the settlements.

Figure 3:
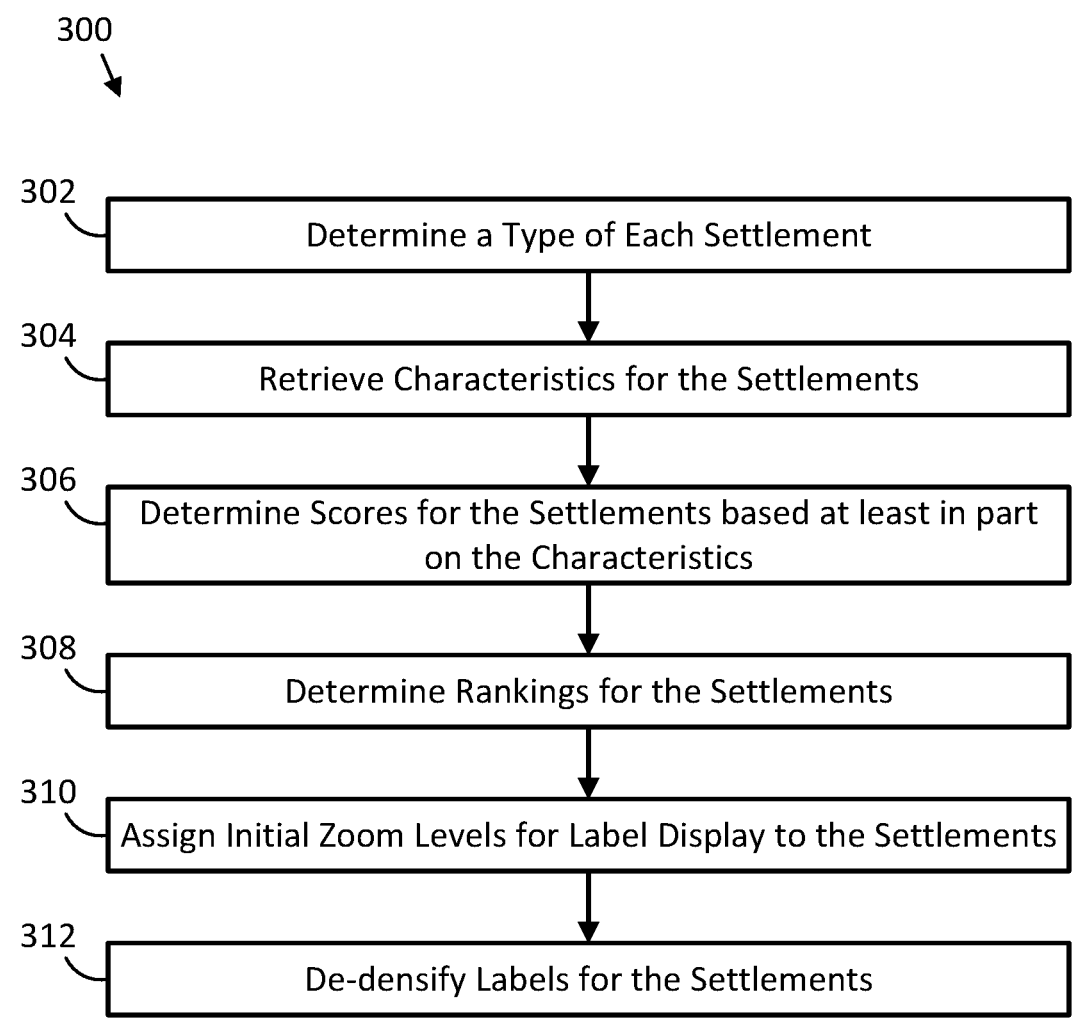
FIG. 3 illustrates an example process for score-based zoom level determination in accordance with some embodiments.

FIG. 3 illustrates an example process 300 for score-based zoom level determination in accordance with some embodiments. For example, the process 300 may be performed by a system to determine zoom levels at which labels for settlements are to be displayed.

At block 302, the process includes the system determining a type of each settlement. For example, the system may identify one or more settlements for which zoom levels at which corresponding labels are to be displayed. The settlements may be settlements for which corresponding zoom levels for display of labels is not known, settlements that are to be displayed within a map, or some combination thereof. The system may determine whether each settlement is a city or a neighborhood. Each of the settlements may have been previously defined as a city or a neighborhood, or whether each settlement is a city or a neighborhood may be determined on one or more characteristics of the settlement. For example, a settlement may be determined to be a city based on a geographical size of the settlement being greater than a threshold size and may be determined to be a neighborhood based on the geographical size of the neighborhood being less than the threshold size. The threshold may differ for different geographical regions.

At block 304, the process includes the system retrieving characteristics for the settlements. In particular, the system may retrieve characteristics that are used to determine scores for each of the settlements. The characteristics may include populations corresponding to each of the settlements, curation (such as provided by a cartographer or other authorized user) corresponding to each of the settlements, geo-search popularity corresponding to each of the settlements, areas corresponding to each of the settlements, user device position traces corresponding to each of the settlements, numbers of address points corresponding to each of the settlements, number of places of interest, or some combination thereof. In some embodiments, the characteristics retrieved for cities may differ from the characteristics retrieved for neighborhoods. For example, the characteristics retrieved for the cities may include populations corresponding to each of the settlements, geo-search popularity corresponding to each of the settlements, curation corresponding to each of the settlements, or some combination thereof. The characteristics retrieved for the neighborhoods may include areas corresponding to each of the settlements, user device position traces corresponding to each of the environments, geo-search popularity corresponding to each of the settlements, number of address points corresponding to each of the settlements, number of places of interest corresponding to each of the settlements, or some combination thereof.

The geo-search popularity (which is also referred to herein as search popularity score) for a settlement may include an amount of times that a settlement was searched, an amount of times entities within the settlement were searched, an amount of times that a collection of information (such as a webpage) related to the settlement was accessed, an amount of times that the settlement and/or entities within the settlement are mentioned in collections of information (such as webpages), an amount of times the settlement and/or entities within the settlement were visited, or some combination. The geo-search popularity may be unique to a user (such as an amount of times that the user searched for the settlement), may be regionally influenced (such as an amount of times that users with a region searched for the settlement), may be globally influenced (such as an amount of times anyone searched for the settlement), or some combination thereof.

The curation for a settlement may include information provided by a cartographer and/or other authorized user that can be utilized for determining which zoom level labels for a settlement are to be displayed. In some embodiments, the curation may include a score provided by the cartographer and/or other authorized user to be utilized for determining a zoom level at which a label is to be displayed for a settlement, an indication of a zoom level at which a label is to be displayed for a settlement, or some combination thereof.

The user device position trace for a settlement may include a number of user devices located within the settlement. For example, the user device position trace may include a number of cellular phones located within the settlement, a number of smart watches located within the settlement, a number of other wearable devices located within the settlement, or some combination thereof.

At block 306, the process 300 includes the system determining scores for the settlements based at least in part on the characteristics. The values of the characteristics may be normalized in some embodiments. For example, the system may determine a highest value presented by the settlements for the characteristic and divide the values for the characteristic of the settlements by the highest value. Accordingly, the values for the characteristics may be normalized to a value between 0 and 1 based on the division by the highest value. In some embodiments, the normalization may be performed based on geographical areas. For example, the settlements may be divided into geographical areas, where each of the geographical areas may be normalized with reference to the other settlements within the geographical area. For example, the geographical area of a settlement cluster in the west coast of the United States of America may be defined as a first geographical area, where the characteristics of the settlements within the geographical area of the settlement cluster in the west coast may be normalized against each other. The geographical area of a settlement cluster in the east coast of the United States of America may be defined as a second geographical area, where the characteristics of the settlements within the geographical area of the settlement cluster in the east coast may be normalized against each other. The normalization by the geographical area may provide for popular settlements in a first geographical area and popular settlements in a second geographical area to both be displayed at a same zoom level although the settlements in the different geographical areas may have differences in the values of the characteristics.

The scores may be determined based at least in part on weights for each of the characteristics. For example, a score for a settlement may be determined by the equation $score = \Sigma_i weight_i * value_i$, where $weight_i$ is a defined weight for characteristic i of the settlement, and $value_i$ is the normalized value of characteristic i of the settlement. The weights for each of the characteristics may be predefined. The weights may be predefined by a user and/or an operator of the system, where the weights may have been determined through testing. For a settlement, the system may multiply the normalized values of the characteristics by the corresponding weights and add up the products to produce the score.

At block 308, the process 300 includes the system determining rankings for the settlements. For example, the system may rank the settlements based on the scores determined in block 306. Settlements with higher scores may be ranked higher, whereas settlements with lower scores may be ranked lower. The ranking may be performed for all the settlements located within the display of the map, where the normalization of the scores performed in block 306 may result in normalized ranking of the settlements in block 308.

Figure 4:
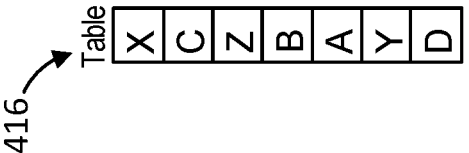
FIG. 4 illustrates an example settlement arrangement showing score ranking in accordance with some embodiments.

FIG. 4 illustrates an example settlement arrangement 400 showing score ranking in accordance with some embodiments. In particular, the settlement arrangement 400 illustrates settlements and rankings for the settlements based on determined scores Rankings are shown with the non-normalized scores and normalized scores to illustrate the differences between non-normalized rankings and normalized rankings.

The settlement arrangement 400 illustrated includes settlement A 402, settlement B 404, settlement C 406, settlement D 408, settlement X 410, settlement Y 412, and settlement Z 414. The settlements are grouped into two geographical areas, where the characteristics of the settlements can be normalized in accordance with the geographical areas. For example, settlement A 402, settlement B 404, settlement C 406, and settlement D 408 are grouped into a first geographical area. Settlement A 402, settlement B 404, settlement C 406, and settlement D 408 may be normalized with each other based on the grouping within the first geographical area. Settlement X 410, settlement Y 412, and settlement Z 414 are grouped into a second geographical area. Settlement X 410, settlement Y 412, and settlement Z 414 may be normalized with each other based on the grouping within the second geographical area.

In the illustrated embodiment, area characteristics and user device position trace characteristics (referred to as trace in FIG. 4) are the characteristics utilized for determining the score. The corresponding area characteristic values and trace characteristic values for the settlements are illustrated in FIG. 4. The scores for the settlements may be determined based on the characteristic values and the trace characteristics.

The settlement arrangement 400 illustrates a first ranking 418 and a second ranking 416. The first ranking 418 illustrates rankings based on scores without the geographical normalization. The ranking order illustrates has settlement C 406 as the highest ranked and settlement D 408 as the lowest ranked. As can be seen, settlement C 406 has a trace value of 3200 (which is the highest trace value) and an area value of 180, which can result in the highest score. Settlement B 404 is the second highest ranked settlement having a trace value of 3100 and an area value of 260. Settlement A 402 is the third highest ranked settlement having a trace value of 3000 and an area of 460. The trace value may be given greater weight than the area value (for example, a weight multiplier for the characteristic trace may be greater than a weight multiplier for the characteristic area). Settlement X 410 may be the fourth highest ranked settlement having a trace value of 3100 and an area value of 30. As can be seen, settlement X 410, settlement Y 412, and settlement Z 414 may be ranked lower than settlement A 402, settlement B 404, and settlement C 406 mainly based on the area values. Without the normalization, settlement A 402, settlement B 404, and settlement C 406 will be assigned to lower zoom levels while settlement X 410, settlement Y 412, and settlement Z 414 will be assigned to higher zoom levels. Accordingly, when a map is displayed with a low zoom level it is possible that labels will be displayed for settlements will be displayed in the geographical area of settlement A 402, settlement B 404, and settlement C 406 while labels will not be displayed in the geographical area of settlement X 410, settlement Y 412, and settlement Z 414. This could be undesirable as settlement X 410, settlement Y 412, and settlement Z 414 may be popular in their geographic area and a viewer of the map may find it beneficial to view the popular settlements in each of the geographic areas.

In contrast, the second ranking 416 may provide the ranking of the settlements with the scores of the settlements being normalized Settlement X 410 may be the highest ranked in the second ranking 416. For example, settlement X 410 has a trace value of 3100 and an area of 30, which are both the highest values of the characteristics in the geographical area of settlement X 410, settlement Y 412, and settlement Z 414. Accordingly, once normalized geographically, settlement X 410 may be assigned the highest score. Settlement C 406 may be the second highest ranked in the second ranking 416. In particular, settlement C 406 may have a trace value of 3200 (which is the highest trace value in the geographical area of settlement A 402, settlement B 404, settlement C 406, and settlement D 408) and an area value of 180 (which is the third highest area value in the geographical area). Due to the normalization, geographically relative high scores in both the geographical area corresponding to settlement X 410, settlement Y 412, and settlement Z 414 and the geographical area corresponding to settlement A 402, settlement B 404. settlement C 406, and settlement D 408 may be assigned to low zoom levels, resulting in labels being displayed for geographically popular settlements in both geographical areas at low zoom levels. Accordingly, the displays of the maps may show labels of settlements having relatively similar popularities in their respective geographical areas at approximately the same zoom levels. This could be desirable for the visual aspect of a display of a map.

At block 310, the process 300 includes the system assigning initial zoom levels for label display to the settlements. For example, the system may assign initial zoom levels at which labels for the settlements are to be displayed for each settlement. The assignment of the initial zoom levels may be based on the rankings produced in block 308, where the higher ranked settlements may be assigned with lower zoom levels for display of the corresponding labels and lower ranked settlements may be assigned with higher zoom levels for display of the corresponding labels.

To assign the initial zoom levels, the system may determine the number of labels to be displayed at each zoom level. The system may determine the number of labels to be displayed at each zoom level based on the equation $quota_z = LOWEST\_ZOOM\_QUOTA*(4*DENSITY\_FACTOR)^{z-LOWEST\_ZOOM}$, where $quota_z$ is the number of labels to be displayed at a zoom level, LOWEST_ZOOM_QUOTA is the number of labels to be displayed at a lowest zoom level available for display of the map, DENSITY_FACTOR is the rate of increase in the number of labels to be displayed for a single zoom level increase, z is the current zoom level, and LOWEST_ZOOM is the lowest zoom level for which labels of a particular settlement type are to be displayed. The LOWEST_ZOOM_QUOTA and DENSITY_FACTOR may be predefined, such as being predefined by a cartographer or another authorized user. The LOWEST_ZOOM may be determined based on a predefined value, such as a predefined value of a maximum number of zoom levels for which labels are to be displayed in a map display.

Once the system has determined the number of labels to be displayed at each zoom level, the system may assign the zoom levels to the settlements based on the number of labels to be displayed at each zoom level and the ranking of the settlements. For example, if five labels are to be displayed at the lowest zoom level, the system may identify the five highest ranked settlements and assign the five highest ranked settlements to have labels to be displayed at the lowest zoom level. If the next higher zoom level is to have 10 additional labels to be displayed, the system may identify the next 10 highest ranked settlements and assign the next 10 highest ranked settlements to have labels to be displayed at the next higher zoom level. The system may continue until the settlements have been assigned for all the zoom levels, or the settlements have been assigned up to the current zoom level to be displayed.

In some embodiments, the system may further take geographical area into account when assigning the initial zoom levels to the settlements. For example, the system may divide the settlements up into geographical clusters, where the geographical clusters may be defined as the same geographical areas utilized for normalizing the scores or different geographical areas from those for normalizing the scores. In some embodiments, the geographical clusters may be metropolitan areas, such as a group of contiguous cities. The system may sum up all the scores of the settlements within a geographical cluster, such as summing up the scores of neighborhoods within a city. The total of summing of the settlements within the geographical cluster may produce a weighting for the geographical cluster. The system may further sum up all of the settlements of the world (or within an area to be displayed within a map in some instances) to get a global weighting. The system may determine the fraction the weighting for the geographical cluster is of the global weighting. The system may utilize the fraction for additional normalization in assigning the initial zoom levels. For example, the additional normalization may be performed by the equation $$\text{quota}_{j,z} = \frac{\text{total\_score}_j}{\text{total\_score}} * \text{quota}_z,$$

where total_score is the global weighting, total_score$_j$ is the weighting for the geographical cluster, and quota$_z$ is from the equation described above for assigning the initial zoom levels. The system may utilize the further normalized scores for performing rankings and assigning the initial zoom levels based on the rankings with the additional normalization.

At block 312, the process 300 includes the system de-densifying labels for the settlements. For example, the system may de-densify labels assigned to the same initial zoom levels. The system may determine a proximity for each of the settlements and determine whether any of the other settlements are located within a proximity of another settlement. The proximity may be predefined, where the proximity may be a predicted area of a map display to be covered by a label corresponding to a settlement in some embodiments. For a first settlement and settlements within the proximity of the first settlement, the system may determine that one of the settlements is to be displayed at the initially assigned zoom level. The system may compare scores for the first settlement and the settlements within the proximity of the first settlement to determine which settlement has the highest score. The system may determine that the settlement with the highest score is to be assigned to the initial zoom level and the rest of the settlements are to be reassigned to the next highest zoom level. In some embodiments where the settlements are reassigned to the next highest zoom level, the system may promote a number of settlements equal to the number of assignments reassigned from the next highest zoom level to the initial zoom level. The settlements promoted may be the settlements with the highest scores that are not within the proximities of the settlements in the initial zoom level. The system may then utilize the updated zoom levels as the zoom levels for display of the map.

Figure 5:
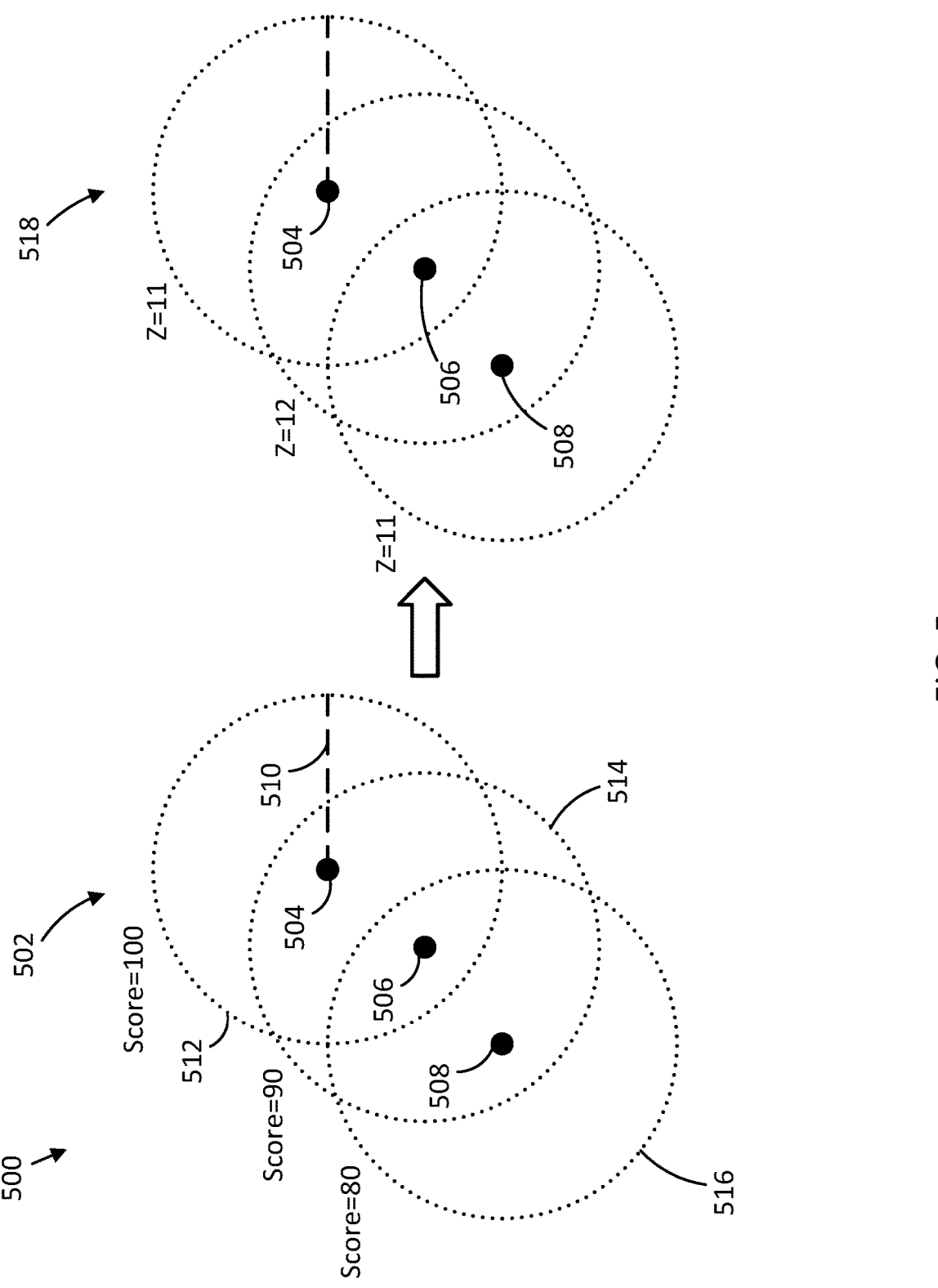
FIG. 5 illustrates an example settlement de-densify arrangement in accordance with some embodiments.

FIG. 5 illustrates an example settlement de-densify arrangement 500 in accordance with some embodiments. For example, the settlement de-densify arrangement 500 illustrates an example of settlement zoom level assignments before and after a de-densify operation, such as the de-densify operation described in relation to block 312.

The settlement de-densify arrangement 500 may include a pre-de-densify arrangement 502. The pre-de-densify arrangement 502 illustrates settlements that may be assigned to a same initial zoom level. For example, the pre-de-densify arrangement 502 may include a first settlement 504, a second settlement 506, and a third settlement 508 assigned to a same initial zoom level. In the illustrated embodiments, the first settlement 504, the second settlement 506, and the third settlement 508 may be assigned to an initial zoom level of 11 in the illustrated embodiment.

Each of the settlements may have a proximity, where each of the proximities may have a radius 510. For example, the system may determine a proximity 512 around the first settlement 504, a second proximity 514 around the second settlement 506, and a third proximity 516 around the third settlement 508. The system may further determine scores for each of the first settlement 504, the second settlement 506, and the third settlement 508. For example, the first settlement 504 is illustrated with a score of 100, the second settlement 506 is illustrated with a score of 90, and the third settlement 508 is illustrated with a score of 80 in the illustrated embodiment.

The system may determine the settlement with the highest score and initiate the de-densify operation with the settlement with the highest score. In some embodiments, the settlement with the highest score may be the settlement with the highest score in a group of settlements with one or more settlements within the proximity of another settlement. In the illustrated embodiment, the system may determine that the first settlement 504 has the highest score and may initiate the de-densify operation with the first settlement 504.

The system may determine whether any settlements are within the proximity of the settlement and/or which settlements are within the proximity of the settlement. In the illustrated embodiment, the system may determine that the second settlement 506 is within the proximity 512 of the first settlement 504.

The system may compare the scores of the settlements within the proximity with the settlement and determine that the settlement with the highest score is to have the label displayed in the currently assigned zoom level and the other settlements are to be reassigned to the next highest zoom level. In the illustrated embodiment, the system may determine that the first settlement 504 has a higher score than the second settlement 506. Based on the first settlement 504 having the higher score, the system may determine that the first settlement 504 is to maintain the assignment of the zoom level 11 while the second settlement 506 is to be reassigned to the next highest zoom level, which is zoom level 12 in the illustrated embodiment.

The system may continue the de-densification operation with the settlement with the next highest score remaining at the same zoom level. For example, the system may determine that the third settlement 508 is the next settlement for the de-densify operation in the illustrated embodiment based on the scores. In particular, the second settlement 506 may have already been reassigned to the next highest level and, therefore, would not have the de-densify operation performed at the current zoom level. The system may determine whether any settlements assigned to the same zoom level as the third settlement 508 are located within the third proximity 516 of the third settlement 508. As the second settlement 506 has already been reassigned to the next highest zoom level, the system may determine that there are no other settlements within the third proximity 516 of the third settlement 508. Since there are no other settlements within the third proximity 516 and there are no other settlements within the pre-de-densify arrangement 502, the system may terminate the de-densify operation.

The settlement de-densify arrangement 500 may include a post-de-densify arrangement 518. the post de-densify arrangement 518 illustrates the zoom level assignments after completion of the de-densify operation. For example, the first settlement 504 and the third settlement 508 are still assigned to zoom level 11 after completion of the de-densification operation in the illustrated embodiment. The second settlement 506 has been reassigned to zoom level 12 after completion of the de-densify operation. Accordingly, labels for the first settlement 504 and the third settlement 508 may be displayed on a display of a map at zoom level 11 and a label for the second settlement 506 may be displayed on a display of a map at zoom level 12.

Figure 6:
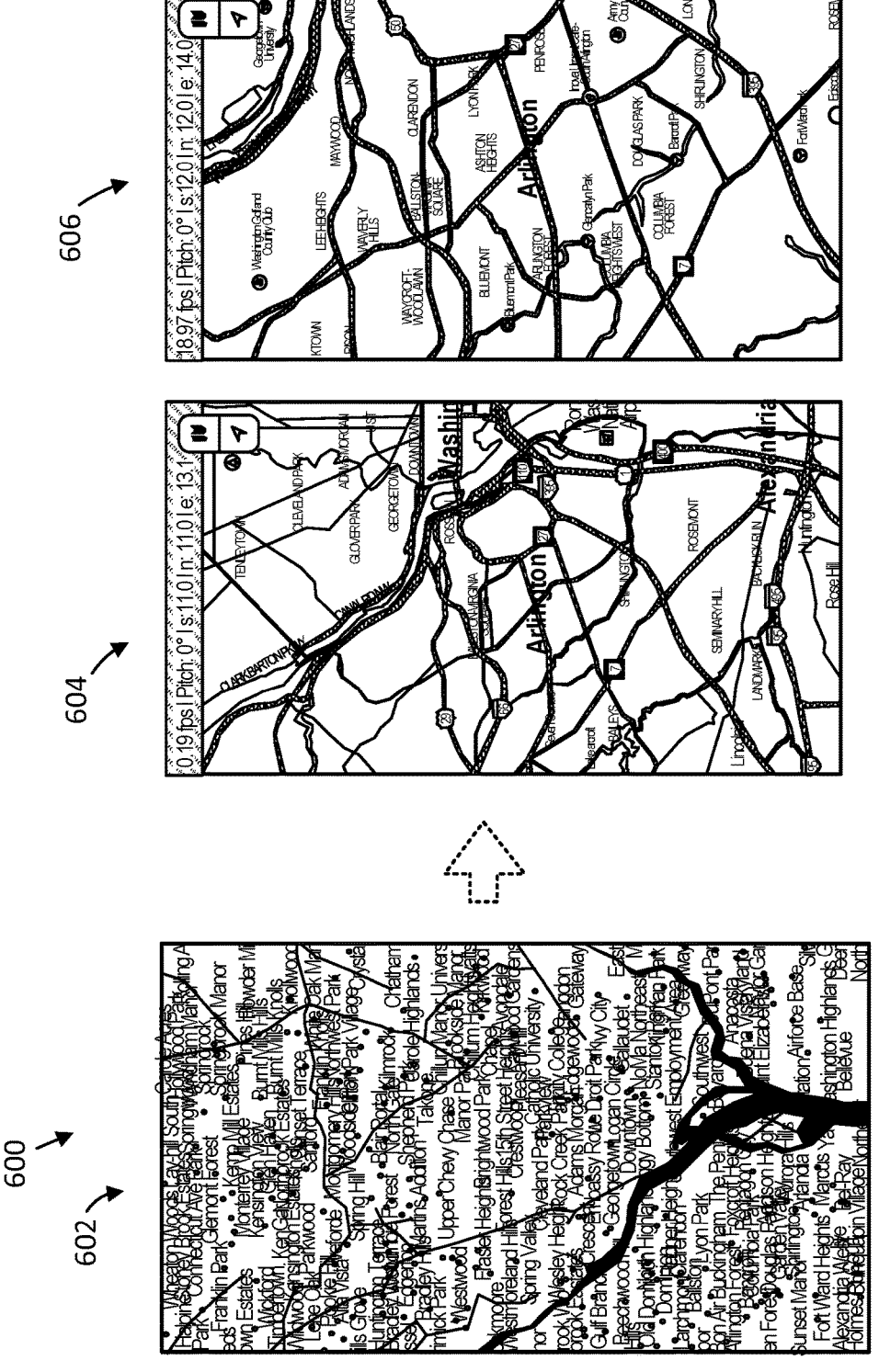
FIG. 6 illustrates an example map display arrangement in accordance with some embodiments.

FIG. 6 illustrates an example map display arrangement 600 in accordance with some embodiments. For example, the map display arrangement 600 may illustrate a map display without performance of the process 300 (FIG. 3), a map display after performance of the process 300 at a first zoom level, and a map display after the performance of the process 300 at a second zoom level.

The map display arrangement 600 may include a first map display 602. The first map display 602 illustrates an example of a map display of an area without performance of the process 300. As can be seen from the first map display 602, the map display includes many labels. The large amount of labels displayed can result in text of the labels being extremely small and can make the labels hard to read. Further, it is impossible to determine popular settlements in the map display based on the labels. It can be seen that the map is hard to interpret.

The map display arrangement 600 may include a second map display 604. The second map display 604 illustrates an example of a map display of an area after performance of the process 300 at a first zoom level. As can be seen from the second map display 604, there are a limited number of labels for settlements shown in the display of the map. The labels displayed may be limited to popular settlements as may be determined by the process 300. It can be easily understood that the map displayed by the second map display 604 may be much easier to interpret as compared to map displayed by the first map display 602. Accordingly, the second map display 604 may be preferred by viewers over the first map display 602.

The map display arrangement 600 may include a third map display 606. The third map display 606 illustrates an example of a map display of a similar area to the second map display 604 after performance of the process 300 at a second zoom level. The second zoom level may be a higher level of zoom than the first zoom level. Based on the zoom, the area displayed by the third map display 606 may be a portion of the area displayed by the second map display 604. The third map display 606 may include additional labels as compared to the second map display 604, where the additional labels may be labels corresponding to the second zoom level. Accordingly, the third map display 606 may be easily interpretable while also providing more information than the second map display 604.

While the process 300 is described in a particular order and with particular elements, it should be understood that the order may be different in other embodiments, and/or may have one or more of the elements omitted in other embodiments. Further, one or more of the elements in the process 300 may be performed concurrently in other embodiments. Progressive Road Infrastructure Display In many instances, the display of a map may include roads. It can be a challenge to present roads that are useful to a viewer of the map. In legacy embodiments, the roads to be displayed on the map may be determined based on the type of road, such as causing interstates to be presented first, intrastates to be presented second, and so on. However, this approach can result in useful roads not being presented. Approaches herein can provide more useful display of roads. For example, the displays of maps may include roads connecting settlements displayed in the map. In some embodiments, the settlements connected by the road may include settlements that have labels displayed in the display of the map. Roads connecting the settlements may be more useful than just including roads based on the type of road without context.

Figure 7:
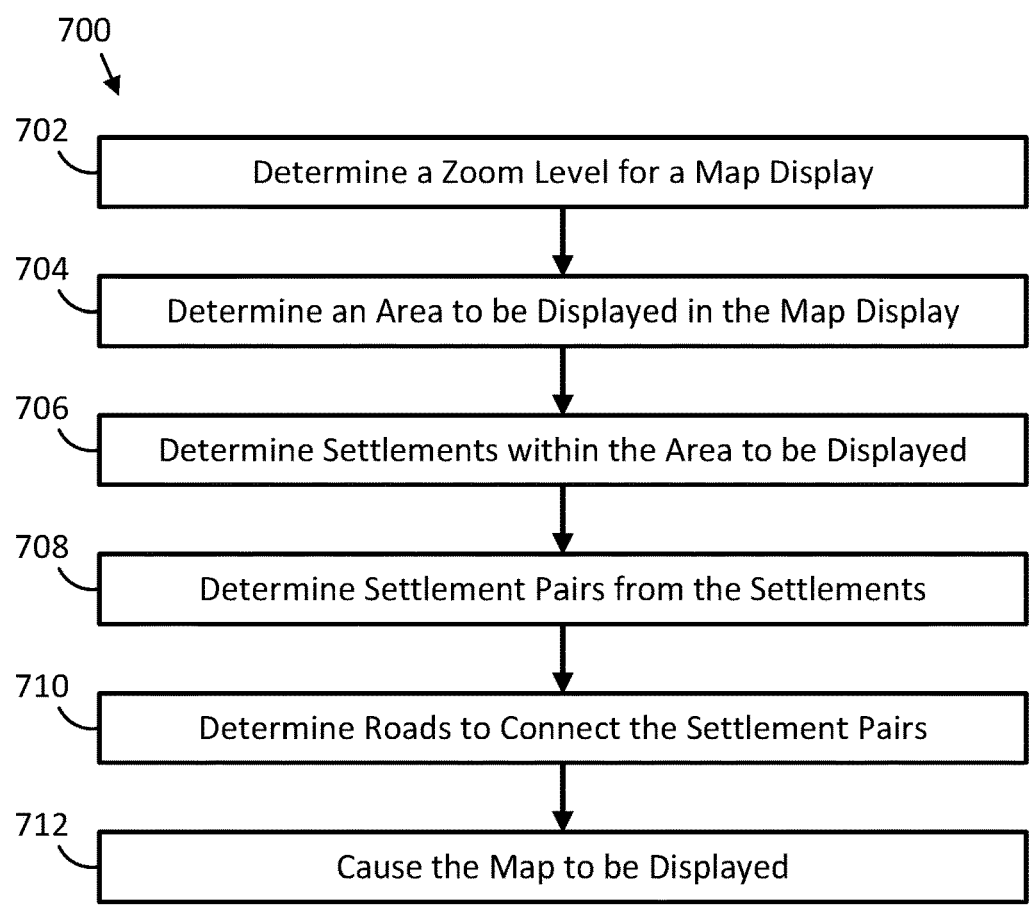
FIG. 7 illustrates an example process for determining settlements to be connected in accordance with some embodiments.

FIG. 7 illustrates an example process 700 for determining settlements to be connected in accordance with some embodiments. For example, the process may identify city pairs to be connected by roads within a display of a map.

At block 702, the process 700 includes the system determining a zoom level for a map display. For example, the system may receive a request to display a map. The request may indicate an area to be displayed within the map, an indication of a point to be displayed in the map, an indication of the zoom level for the display of the map, or some combination thereof. The indication of the area may include an indication of latitudinal and longitudinal values that indicate the area, distances that indicate the area to be displayed, points on interest (such as physical features, settlements, or other features that may indicate points on a map) that indicate the area to be displayed, or some combination thereof. The indication of the point may include an indication of a settlement to be included in the area to be displayed, an indication of a point of interest to be in included in the area to be displayed, an indication of a latitudinal value and longitudinal value that indicates a point to be included in the area to be displayed, or some combination thereof. The system may determine the zoom level for the map display based at least in part on the indication of the zoom level.

At block 704, the process 700 includes the system determining an area to be displayed in the map display. The system may determine the area to be displayed based on the indication of the area to be displayed within the map, the indication of the point to be displayed in the map, and/or the indication of the zoom level for display of the map received in the request.

At block 706, the process 700 includes the system determining settlements within the area to be displayed. For example, the system may determine settlements within the area to be displayed in the map display based on the determined area in block 704. The settlements determined within the area may be settlements that are to have a corresponding label displayed in the map display based on the zoom level.

Figure 8:
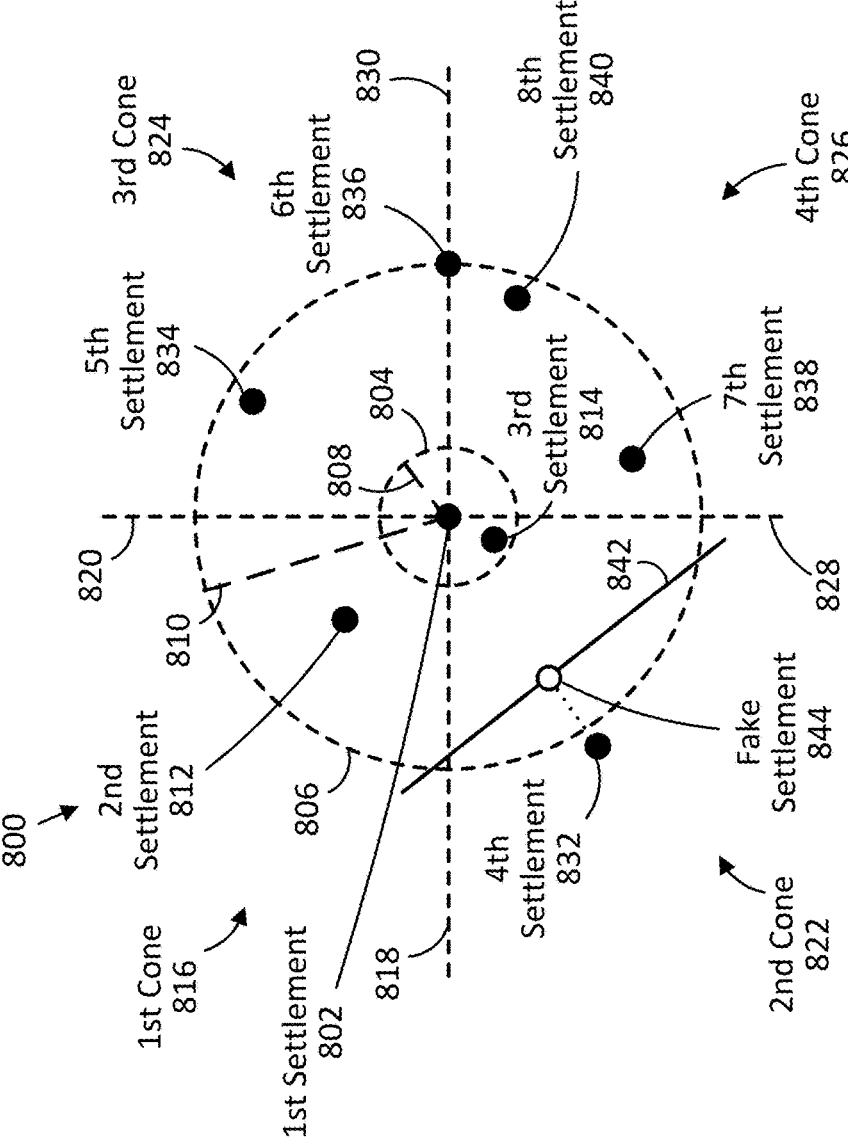
FIG. 8 illustrates a settlement pair identification arrangement in accordance with some embodiments.

At block 708, the process 700 includes the system determining settlement pairs from the settlements determined in block 706. A settlement pair may include two settlements of which roads are to connect in display of the map. The two settlements may be greater than or equal to a minimum distance and shorter than or equal to a maximum distance apart from each other. The distances may be a straight line distance. The minimum distance and the maximum distance may be determined based on the zoom level for the map display, a settlement density around the two settlements, and/or a region (such as a country) in which the two settlements are located. FIG. 8 illustrates a settlement pair identification arrangement 800 in accordance with some embodiments. For example, the settlement pair identification arrangement 800 illustrates settlement pair determination in accordance with some embodiments.

To identify system pairs, the system may identify a first settlement from the settlements determined in block 706. In some embodiments, the first settlement may be determined based on the first settlement having a highest score (such as a score determined as described throughout this disclosure) of the settlements. In other embodiments, the first settlement may be determined based on a location of the first settlement in the map display (such as being located closest to a center of the map display), based on the first settlement being indicated in the request, the first settlement being assigned the lowest zoom level of the settlements, the first settlement being randomly selective or some combination thereof. In the settlement pair identification arrangement 800, the system may have identified the first settlement 802 as the first settlement.

The system may determine a minimum distance and a maximum distance from the first settlement. The minimum distance and the maximum distance may define an inner circumference and an outer circumference between which settlement pairs for the first settlement may be determined. The minimum distance and the maximum distance may be determined based on the zoom level for the map display, a settlement density around the two settlements, and/or a region (such as a country) in which the first settlement is located.

For the first settlement 802, the system may determine a minimum circumference 804 and a maximum circumference 806. The minimum circumference 804 may define a minimum distance 808 from the first settlement 802 and the maximum circumference 806 may define a maximum distance 810 from the first settlement 802. The minimum circumference 804 and the maximum circumference 806 may define an area in which settlement pairs for the first settlement 802 may be determined. For example, potential settlements to be paired as part of a settlement pair with the first settlement 802 may be located between the minimum circumference 804 and the maximum circumference 806. Accordingly, the system may limit potential settlements to be determined to be paired with the first settlement 802 to between the minimum circumference 804 and the maximum circumference 806.

The system may determine a second settlement to be paired with the first settlement. For example, the system may determine select a second settlement from the settlements located between the minimum circumference and maximum circumference to be paired with the first settlement. The system may determine the second settlement based on the second settlement being the closest settlement, from the settlements determined in block 706, to the first settlement located between the minimum circumference and the maximum circumference of the first settlement. In other embodiments, the system may determine the second settlement based on a score associated with the second settlement, a zoom level (such as the lowest zoom level of the settlements) assigned to the second settlement, one or more characteristics of the second settlement, or some combination thereof. The system may determine that the first settlement and the second settlement are a first settlement pair.

In the settlement pair identification arrangement 800, the system may determine that a second settlement 812 is to be paired with the first settlement 802. The system may determine that the second settlement 812 is to be paired with the first settlement 802 based on the second settlement 812 being the closest settlement to the first settlement 802 located between the minimum circumference 804 and the maximum circumference 806 of the first settlement 802. For example, the system may identify a third settlement 814 as the closest settlement to the first settlement 802. However, the system may determine that the third settlement 814 is ineligible for pairing with the first settlement 802 based on the third settlement 814 being located closer to the first settlement 802 than the minimum circumference 804 of the first settlement 802. The system may determine that the second settlement 812 is the next closest settlement to the first settlement 802 and is located between the minimum circumference 804 and the maximum circumference 806. The system may determine that the first settlement 802 and the second settlement 812 are a first settlement pair based on the determination of the second settlement 812.

The system may define cones based on the second settlement for determining additional settlements to be paired with the first settlement to form additional settlement pairs. In particular, the system may separate the area surrounding the first settlement 802 into subsections referred to as cones. The cones may have edges radiating from the first settlement 802 where the edges of a cone may be at a determined angle from each other. The angle may be determined based on the zoom level for display of the map, settlement density around the first settlement 802 (such as the density of the settlements at particular zoom levels or the density of settlements at any zoom level), settlement density within the area to be displayed by the map (such as the density of the settlements at particular zoom levels or the density of settlements at any zoom level), region (such as country) in which the first settlement is located, or some combination thereof. For example, the angle may be larger for higher densities of the settlements and smaller for lower densities of the settlements in some embodiments. The angle may be 180 degrees, 120 degrees, 90 degrees, 45 degrees, 30 degrees, or 12 degrees in some embodiments. The angles of all the cones for a settlement may be equal. One of the cones may be centered around the first paired settlement with the first settlement. For example, one of the cones for the first settlement may be centered around the second settlement that was determined to be paired with the first settlement.

The settlement pair identification arrangement 800 includes four cones in the illustrated embodiment. Each of the cones is defined by an angle of 90 degrees. In particular, the settlement pair identification arrangement 800 includes a first cone 816. The first cone 816 is defined by a first edge 818 and a second edge 820. The first edge 818 and the second edge 820 extend from the first settlement 802 and a have an angle between the first edge 818 and the second edge 820 of 90 degrees. The location of the first cone 816 may have been determined based on the second settlement 812 that was determined as the settlement to be paired with the first settlement 802 as the first settlement pair. In particular, the first cone 816 may be centered around the second settlement, such an angle of 45 degrees is formed between the first edge 818 and the second settlement 812 and an angle of 45 degrees is formed between the second edge 820 and the second settlement 812.

The settlement pair identification arrangement 800 may further include a second cone 822, a third cone 824, and a fourth cone 826. The positions of the second cone 822, the third cone 824, and the fourth cone 826 may be determined relative to the first cone 816. For example, the angles of the cones when added together may cover the 360 degrees from the first settlement 802. The second cone 822 may share the first edge 818 with the first cone 816 and extend 90 degrees away from the first edge 818 to a third edge 828. The third cone 824 may share the second edge 820 with the first cone 816 and extend 90 degrees away from the second edge 820 to a fourth edge 830. The fourth cone 826 may be defined by the third edge 828 and the fourth edge 830, where the fourth cone 826 extends between the third edge 828 and the fourth edge 830 that creates an angle of 90 degrees for the fourth cone 826.

The system may determine additional settlement pairs for the first settlement. For example, the system may determine at the most one settlement from each of the cones to be paired with the first settlement as the additional settlement pairs. In other embodiments, the maximum amount of settlements that may be paired with the first settlement from a cone may be different. The settlements to be paired with the first settlement from each cone may be the closest settlement to the first settlement from the cone while still being further away from the first settlement than the minimum circumference and closer to the first settlement than the maximum circumference. In other embodiments, the settlement within a cone to be paired with the first settlement may be the settlement with the lowest zoom level located within the cone, the settlement with the highest score located within the cone, the settlement furthest away from the first settlement located within the cone and closer than the maximum circumference and farther away than the minimum circumference.

In the instance where there are no settlements located between the minimum circumference and the maximum circumference within a cone, the system may determine that there are no settlements to be paired with the first settlement within the cone. In some embodiments, the system may generate a fake settlement for pairing with the first settlement for the cone that does not have any settlements located between the minimum circumference and the maximum circumference. For example, the system may determine a road and/or road segment that passes through the cone and between the minimum circumference and the maximum circumference. The system may further determine that the road and/or road segment is associated with a certain zoom level. The road and/or road segment may be a road and/or road segment having the certain zoom level that passes closest to a settlement located closer than the minimum circumference or farther away than the maximum circumference. The system may generate a fake settlement at a point on the road and/or road segment closest to the settlement located closer than the minimum circumference or farther away than the maximum circumference. The system may pair the fake settlement with the first settlement to create a settlement pair.

Settlements located on an edge between two cones may be analyzed as a settlement in both of the cones to determine whether the settlement is to be paired with the first settlement or may be analyzed in one of the two cones to determine whether the settlement is to be paired. The system may analyze each of the cones corresponding to the first settlement to determine settlements to be paired with the first settlement.

In the settlement pair identification arrangement 800, the system may determine whether any of the second cone 822, the third cone 824, and the fourth cone 826 include any settlements to be paired with the first settlement 802. For the second cone 822, the system may determine that there are no settlements within the second cone 822 to be paired with the first settlement 802. In particular, the second cone 822 may have the third settlement 814 and a fourth settlement 832. However, the third settlement 814 is closer to the first settlement 802 than the minimum circumference 804 and the fourth settlement 832 may be farther away from the first settlement 802 than the maximum circumference. Accordingly, the system may determine that the third settlement 814 and the fourth settlement 832 are not qualified to be paired with the first settlement 802 and, therefore, there are no settlements within the second cone 822 to be paired with the first settlement 802.

In embodiments where fake settlements are configured to be generated, the system may determine whether a fake settlement is to be generated within the second cone 822. For example, the system may determine whether any roads and/or road segments assigned a particular zoom level pass through the second cone 822 and between the minimum circumference 804 and the maximum circumference 806. In the illustrated embodiment, the system may identify a first road 842 that extends within the second cone 822 and has at least a portion located between the minimum circumference 804 and the maximum circumference 806. Based on the system identifying the first road 842, the system may determine a point along the first road 842 that is closest to the fourth settlement 832 and generate a fake settlement 844 at the point. The system may pair the fake settlement 844 with the first settlement 802 to produce a settlement pair.

For the third cone 824, the system may determine a fifth settlement 834 is to be paired with the first settlement 802. For example, the system may determine that the fifth settlement 834 is within the third cone 824. Further, the system may determine that a sixth settlement 836 is located on the fourth edge 830 between the third cone 824 and the fourth cone 826. In the illustrated embodiment, the system may analyze the sixth settlement 836 as part of both the third cone 824 and the fourth cone 826. The system may compare a distance from the fifth settlement 834 to the first settlement 802 with a distance from the sixth settlement 836 to the first settlement 802. The system may determine that the fifth settlement 834 is to be paired with the first settlement 802 based on the fifth settlement 834 being closer to the first settlement 802 than the sixth settlement 836. Accordingly, the first settlement 802 and the fifth settlement 834 may form a second settlement pair for the first settlement 802, the second settlement 812 and the first settlement 802 forming a first settlement pair for the first settlement 802.

For the fourth cone 826, the system may determine that a seventh settlement 838 is to be paired with the first settlement 802. For example, the system may determine that the seventh settlement 838 and an eighth settlement 840 are located within the fourth cone 826. The system may also determine that the sixth settlement 836 is located on the fourth edge 830 between the third cone 824 and the fourth cone 826. In the illustrated embodiment, the system may analyze the sixth settlement 836 as part of the fourth cone 826. The system may compare a distance from the seventh settlement 838 to the first settlement 802 with a distance from the eighth settlement 840 to the first settlement 802 and a distance from the sixth settlement 836 to the first settlement 802. The system may determine that the seventh settlement 838 is to be paired with the first settlement 802 based on the seventh settlement 838 being closer to the first settlement 802 than the eighth settlement 840 and the sixth settlement 836. Accordingly, the first settlement 802 and the seventh settlement 838 may form a third settlement pair for the first settlement 802.

The system may repeat the operation for determining the settlement pairs for each of the settlements within the map display for which labels are to be displayed. In other instances, the system may repeat the operation for determining the settlement pairs for each settlement assigned with, or lower than, a particular zoom level, all settlements located within the map display, or settlements defined by a user.

At block 710, the process 700 includes the system determining roads to connect the settlement pairs. For example, the system may determine roads for connecting a first settlement and a second settlement of a settlement pair in accordance with the approaches for determining roads for connecting settlements described herein. The system may determine the roads to connect settlement pairs for each settlement pair.

At block 712, the process 700 includes the system causing the map to be displayed. For example, the system may display the map on a display of the system, or may provide the map to another system or device coupled to the system.

The map may include the settlements, the labels for at least a portion of the settlements, the roads connecting the settlement pairs, or some combination thereof.

While the process 700 is described in a particular order and with particular elements, it should be understood that the order may be different in other embodiments, and/or may have one or more of the elements omitted in other embodiments. Further, one or more of the elements in the process 700 may be performed concurrently in other embodiments.

Figure 10:
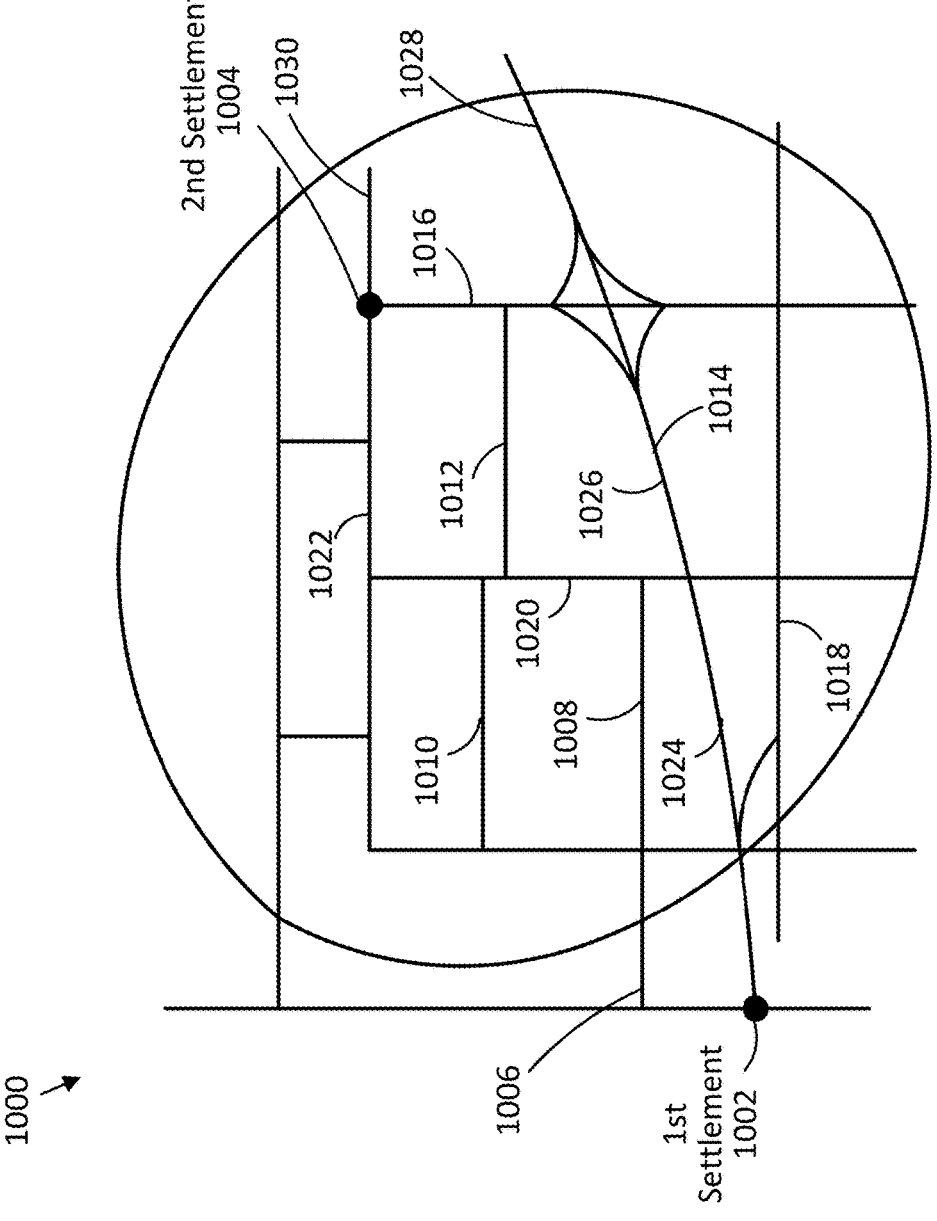
FIG. 10 illustrates an example map arrangement in accordance with some embodiments.
Figure 11:
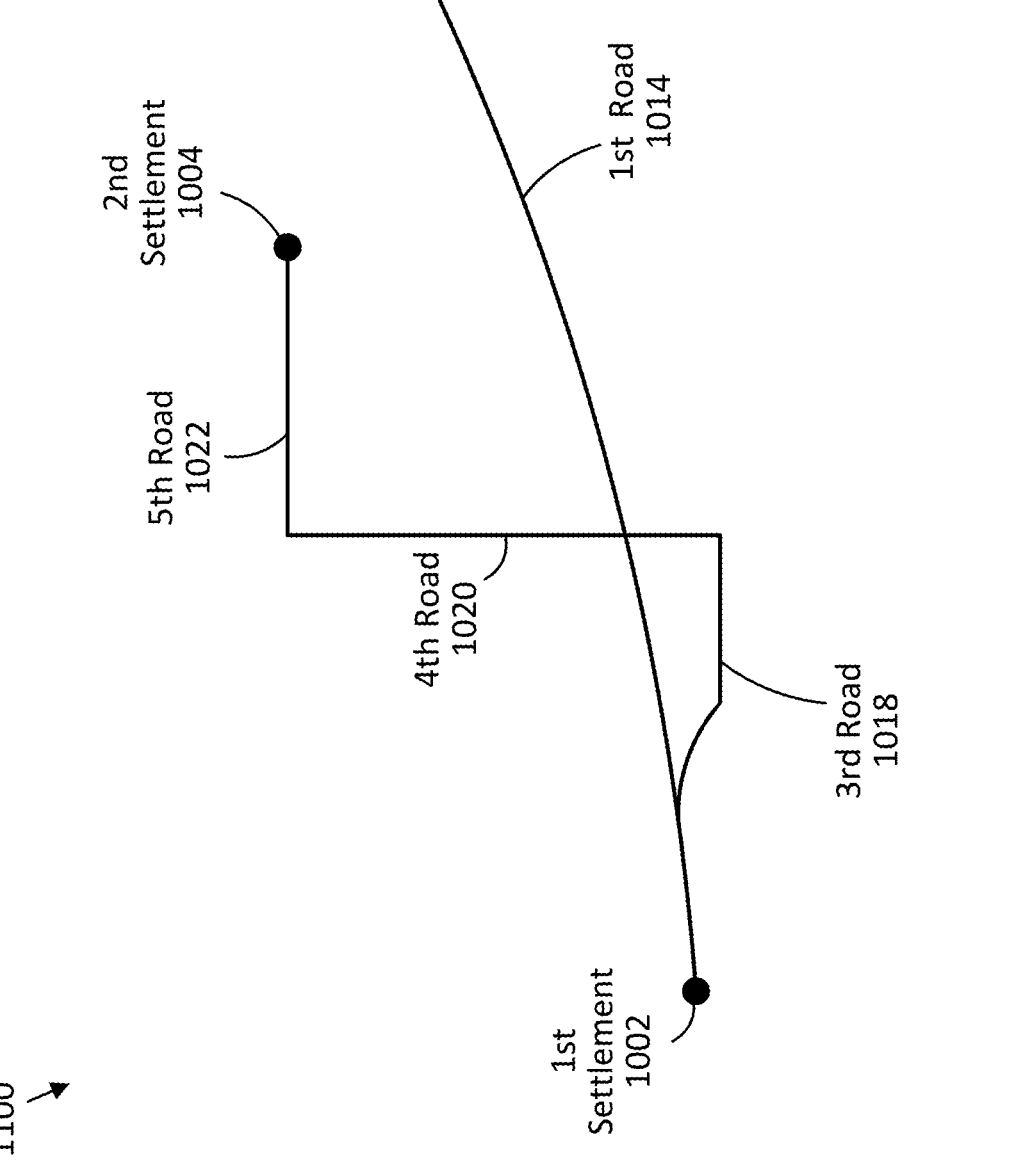
FIG. 11 illustrates another example map arrangement in accordance with some embodiments.

FIG. 9 illustrates an example process 900 for determining roads for a settlement pair in accordance with some embodiments. For example, the process 900 may determine roads to be displayed in a map display. FIG. 10 illustrates an example map arrangement 1000 in accordance with some embodiments. FIG. 11 illustrates another example map arrangement 1100 in accordance with some embodiments. For example, FIG. 10 illustrates a map arrangement 1000 prior to application of the process 900 or determined partially through the process 900. FIG. 11 illustrates a map arrangement 1100 produced after the application of the process 900.

At block 902, the process 900 includes the system identifying a settlement pair to be connected by roads. For example, the system may determine the settlement pair in accordance with the determination of settlement pairs described in relation to block 706 (FIG. 7). In the map arrangement 1000 and the map arrangement 1100, the settlement pair determined may include a first settlement 1002 and a second settlement 1004. The system may determine that the first settlement 1002 and the second settlement 1004 are to be connected by roads based on the first settlement 1002 and the second settlement 1004 being in a settlement pair.

At block 904, the process 900 includes the system determining roads within the area to be displayed by the map display. For example, the system may determine an area to be displayed by the map display. The system may determine roads that are located within the area. FIG. 10 shows example roads that may be in an area to be displayed by a map display.

In some embodiments, determining the roads may include identifying one or more road segments within the area to be displayed by the map display. The system may determine whether each of the road segments is a separate road or is to be considered as part of a road that includes two or more road segments. The system may identify a road based on road segment property matching. For example, the system may compare one or more properties of road segments to determine whether the road segments to be grouped together as a road. The properties of the road segments may include a country corresponding to the road segment, a state and/or other region corresponding to the road segment, a zip code corresponding to the road segment, a name corresponding to the road segment, a classification corresponding to the road segment, a geometry of the road segment, or some combination thereof.

As an example, the map arrangement 1000 may include a first road segment 1006 and a second road segment 1008. The system may determine that the first road segment 1006 and the second road segment 1008 correspond to one or more matching properties. For example, the system may determine that the first road segment 1006 and the second road segment 1008 both correspond to a same country, both correspond to a same state and/or other region, both correspond to a same zip code, both correspond to a same name, both correspond to a same classification, both have a same geometry (for example, extend in approximately (within 5 degrees) a same direction adjacent to the meeting point between the first road segment 1006 and the second road segment 1008), or some combination thereof. Based on the determination that the first road segment 1006 and the second road segment 1008 correspond to one or more matching properties, the system may determine that the first road segment 1006 and the second road segment 1008 are to be treated as parts of a road.

The map arrangement 1000 may further include a third road segment 1010 and a fourth road segment 1012. As can be seen, the third road segment 1010 and the fourth road segment 1012 do not meet as there is a vertical shift between the third road segment 1010 and the fourth road segment 1012. However, the system may still determine that the third road segment 1010 and the fourth road segment 1012 are to be treated as part of a road based on the third road segment 1010 and the fourth road segment 1012 both corresponding to a same country, both corresponding to the same state and/or other region, both corresponding to a same zip code, both corresponding to a same name, both corresponding to a same classification, both extending in a same direction, or some combination thereof.

In some embodiments, the properties for the roads and/or road segments may be received from two or more different sources. In some of these embodiments, the properties for the roads and/or road segments may be retrieved from two sources that have conflicting information for the properties. For example, one of the sources may refer to a technical name for a road and/or road segment (such as I-45) whereas another of the sources may refer to the same road and/or road segment by a common name (such as Gulf Freeway). In these embodiments, the system may determine that the properties provided by the sources refer to the same road and/or road segment based on the properties corresponding to a road and/or road segment within a same country, which a same state and/or other region, within a same zip code, having the same name, having the same classification, having the same geometry, being in the same location, or some combination thereof. The system may consolidate the conflicting information, such as by utilizing the information from one of the sources, combining the information, and/or verifying which of the information should be utilized with one or more additional sources.

In some of these embodiments where the properties for the road and/or road segments are received from two or more different sources, the different sources may provide different properties for the same roads and/or road segments and/or the system may utilize different properties from the different sources. For example, a first source may provide the position of a road and/or road segment, whereas a second source may provide both the position of the road and/or the road segment and the name of the road and/or road segment. The system may be configured to utilize the first source for the position of the road and/or road segment and to utilize the second source for the name of the road and/or road segment. For example, the system may be configured to utilize the first source for the position based on the first source having higher trust for positioning of road and/or road segment, but be configured to utilize the second source for the name based on the name for the road and/or road segment being unavailable from the first source (such as being prohibited for use through copyright restrictions). The system may compare one or more of the properties received from the first source with one or more properties received from the second source to determine that the properties are referring to the same road and/or road segment. Once the system determines that the properties are referring to the same road and/or road segment, the system may utilize the corresponding properties from the first source and the corresponding properties from the second source to be utilized for the map display.

At block 906, the process 900 includes the system determining zoom levels assigned to the roads. In particular, the system may determine zoom levels assigned to the roads and/or the road segments. In instances where road segments of a road are assigned different zoom levels, the system may maintain the zoom levels of the road segments or may assign the road with a zoom level based on the road segments that are included in the road (such as assigning the road a highest zoom level of the road segments, assigning the road a lowest zoom level of the road segments, or assigning the road an average zoom level (or a closest zoom level to the averaged value of the zoom levels) of the road segments. The zoom levels of the roads and/or road segments may be assigned by cartographer (or other authorized user), may be determined based on one or more properties corresponding to the road and/or road segment, or some combination thereof.

At block 908, the process 900 includes the system determining settlement centers for settlement pairs. For example, the system may determine the centers of the settlements and/or adjusted centers of the settlements of a settlement pair. The system may determine a center or an adjusted center for a first settlement of the settlement pair and a center or an adjusted center for a first settlement of the settlement pair.

The system may determine the center or the adjusted center of the settlements within the settlement pair based on the roads, road segments, zoom levels for the roads, and/or zoom levels for the road segments within the area to be displayed within the map display and the zoom level for the map display. For example, the system may determine the roads and/or road segments available for display within the map display based on the zoom levels for the roads and/or the road segments and the zoom level for the map display. In some embodiments, the road and/or road segments available for display may be assigned a zoom level equal to or below the zoom level for the map display. In some embodiments, the system may determine one or more roads and/or road segments are available based on an indication of a cartographer and/or another authorized user, such as an indication that a road and/or road segment is to be included in map displays of the area and/or an indication that road and/or road segment is to be included in certain zoom level displays.

The determined center or adjusted center of each of the settlements of the settlement pair may depend on how close the roads and/or road segments available for display within the map display are to the center of the settlements. In instances where the roads and/or the road segments pass through or intersect with the center of the settlement, the system may determine the center of the settlement to be the actual center of the settlement.

In instances where the roads and/or road segments do not pass through or intersect with the center of the settlement, an adjusted center of the settlement may be determined, and/or additional roads and/or additional road segments may be made available for display within the map display. For example, the system may determine a closest point along one of the available roads and/or road segments available for display in some embodiments. The system may generate an adjusted center of the settlement at the closest point along the road and/or road segment. In some embodiments, the system may identify one or more additional roads and/or road segments assigned zoom levels higher than the zoom level for the map display that connect one or more of the available roads and/or road segments to the center of the settlement. The system may make the additional roads and/or road segments available for display within the map display.

At block 910, the process 900 includes the system may determine roads to connect the settlement pair. For example, the system may determine roads and/or road segments from the roads and/or road segments available for display within the map display that connect the settlement pair. The system may determine one or more routes between the settlements of the settlement pair, where each of the routes may be formed of one or more roads and/or road segments. Each of the routes may extend between the center or the adjusted center of the first settlement of the settlement pair and the center or adjusted center of the second settlement of the settlement pair.

The system may determine the route based on zoom levels assigned to the roads and/or road segments, any indications of roads to be included in the map display, and/or a zoom level for the map display. For example, the system may determine a route between the first settlement of the settlement pair and the second settlement of the settlement pair that includes the roads and/or road segments with the lowest assigned zoom levels and/or the lowest assigned average zoom levels. In some embodiments, the system may take other factors into determining the route to be displayed, such as the expected travel direction of a viewer of the map display, a length of the routes, traffic conditions along the routes, construction along the routes, expected fuel consumption along the routes, or some combination thereof.

In the map arrangement 1000, the system may determine a route from the first settlement 1002 to the second settlement 1004. The map arrangement 1000 may include a first road 1014 that was indicated to be included in the map display. For example, the first road 1014 may be a freeway that was indicated to be included based on the importance of the freeway. Accordingly, the system may determine that the first road 1014 is to be included in the display. As example, the system may identify a first route from the first settlement 1002 to the second settlement 1004 that includes the first road 1014 and a second road 1016, and a second route that includes the first road 1014, a third road 1018, a fourth road 1020, and a fifth road 1022. In the illustrated embodiment, the system may compare the zoom levels associated with the first route with the zoom levels associated with the second route to determine which of the routes is to be included in the map display. The system may determine that the zoom levels associated with the second route are lower zoom levels than the zoom first route, and may determine the second route is to be displayed within the map display based on the second route being associated with the lower zoom levels. For example, the second road 1016 may be assigned a high zoom level, which may indicate that the second road 1016 is a relatively small road. In comparison, the third road 1018, the fourth road 1020, and the fifth road 1022 may be assigned lower zoom levels than the second road 1016, which may indicate that the third road 1018, the fourth road 1020, and the fifth road 1022 are larger roads than the second road 1016. The system may determine that the larger roads are to be included in the map display and, accordingly, may determine that the second route is to be included in the map display.

At block 912, the process 900 includes the system determining whether any portions of the roads to connect the settlement pair are to be excluded. For example, the system may determine whether any portion of the roads extend outside of the route between the first settlement and the second settlement of the settlement pair. The system may determine to exclude the portion of the roads that extend outside of the route between the first settlement and the second settlement. In some embodiments, the system may further determine whether the portion of the roads were indicated (such as by a cartographer or another authorized user) to be included in the map display and may determine not to exclude the portions of the roads based on the portion of the roads being indicated to be included.

In the map arrangement 1000, the system may determine that a portion of the first road 1014 extends outside of the determined route between the first settlement 1002 and the second settlement 1004. For example, the system may determine that a first portion 1024, a second portion 1026, and a third portion 1028 of the first road 1014 extend outside of the second route between the first settlement 1002 and the second settlement 1004 that was determined in block 910. However, the system may further determine that the first road 1014 (including the first portion 1024, the second portion 1026, and the third portion 1028) was indicated to be included in the map display and, therefore, may determine not to exclude the first portion 1024, the second portion 1026, and the third portion 1028.

Further, the system may determine a first portion 1030 of the fifth road 1022 extends outside of the determined route. In particular, the first portion 1030 extends past the second settlement 1004 to an area without a label to be displayed in the map display. The system may determine to exclude the first portion 1030 based on the first portion 1030 extending outside of the determined route. It should be understood that additional portions of roads may be excluded from the map arrangement 1000 based on the portions of the roads extending outside of the determined route, although the description of the exclusion of the additional portions of the roads are excluded for brevity and clarity.

The map arrangement 1100 illustrates an example of the roads that may be determined to be included in the map display based on the performance of process 900. In particular, the map arrangement 1100 includes the first road 1014 in the illustrated embodiment. The map arrangement 1100 may include the first road 1014 based on an indication (such as from a cartographer or other authorized user) that the first road 1014 is to be included in the map display. Further, the map arrangement 1100 may include portions of the third road 1018, the fourth road 1020, and the fifth road 1022 that were part of the second route determined to be included in the map display.

As can been seen in comparison between the map arrangement 1000 and the map arrangement 1100, the map arrangement 1100 may include less roads than the map arrangement 1000, which can make it easier to identify the route between the first settlement 1002 and the second settlement 1004. This reduction in roads displayed may be extremely beneficial in areas where there are many roads that can make it hard to identify routes between settlements.

Block 902 through block 912 may be repeated for all determined settlement pairs for a map display. For example, when there are more than one settlement pair to be displayed within a map display, block 902 through block 912 may be repeated for each of the settlement pairs to determine roads to be displayed within the map display for each of the settlement pairs. Accordingly, the system may determine roads for each of the settlement pairs within the map display to be included in the map display.

At block 914, the process 900 includes the system providing the roads to be displayed by the map display. For example, the system may provide the roads for display on a display of the system and/or may provide the roads to another device for display on a display of the device. The roads provided may include the roads determined to be displayed based on connecting settlement pairs.

While the process 900 is described in a particular order and with particular elements, it should be understood that the order may be different in other embodiments, and/or may have one or more of the elements omitted in other embodiments. Further, one or more of the elements in the process 900 may be performed concurrently in other embodiments.

FIG. 12 illustrates an example process 1200 for causing an area of a map to be displayed in accordance with some embodiments. For example, the process 1200 may cause an area of a map to be displayed with labels for one or more settlements. The process 1200 may be performed by a system and/or a device as described throughout this disclosure. For brevity, the process 1200 is described as being performed by a system herein.

At block 1202, the process 1200 includes the system determining a zoom level for display of an area of a map. For example, the system may determine a zoom level for display of an area of a map based on a request for display of the map.

At block 1204, the process 1200 includes the system identifying one or more settlements represented within the area of the map. For example, the system may identify one or more settlements located in the area to be displayed by the map.

At block 1206, the process 1200 includes the system determining zoom levels for each of the one or more settlements. For example, the system may determine zoom levels for each of the one or more settlements identified in block 1204 based at least in part on geo-search popularities of the one or more settlements.

In some embodiments, determining the zoom levels for each of the one or more settlements may include determining cities from the one or more settlements and determining zoom levels for the cities based at least in part on geo-search popularities for the cities, and at least one of populations of the cities or curation information for the cities. Determining the zoom levels for the cities may include determining a first weighting for the geo-search popularities for the cities, and at least one weighting corresponding to the at least one of the populations of the cities or the curation information. The first weighting and the at least one weighting may be predefined. Further, determining the zoom levels may include applying the first weighting to the geo-search popularities and applying the at least one weighting to the at least one of the populations of the cities or the curation information to generate scores for each of the cities. The zoom levels for the cities may be determined based at least in part on the scores.

In some embodiments, determining the zoom levels for each of the one or more settlements may include determining neighborhoods from the one or more settlements. Further, determining the zoom levels may include determining zoom levels for the neighborhoods based at least in part on geo-search popularities for the neighborhoods, and at least one of neighborhood areas for the neighborhoods, user device position traces for the neighborhoods, numbers of address points for the neighborhoods or numbers of points of interest for the neighborhoods. Determining the zoom levels for the neighborhoods may include determining a first weighting for the geo-search popularities for the neighborhoods, and at least one weighting corresponding to the at least one of the neighborhood areas, the user device position traces, the numbers of address points or the numbers of points of interest. The first weighting and the at least one weighting may be predefined. Determining the zoom levels may further include applying the first weighting to the geo-search popularities for the neighborhoods and applying the at least one weighting to the at least one of the neighborhood areas, the user device position traces, the number of address points or the number of points of interest to generate scores for each of the neighborhoods. The zoom levels for the neighborhoods may be determined based at least in part on the scores.

In some embodiments, determining the zoom levels for each of the one or more settlements may include dividing the one or more settlements into two or more clusters (where the two or more clusters may be defined by geographic area). The two or more clusters may be normalized, where the zoom levels for each of the one or more settlements are based at least in part on the normalized two or more clusters.

At block 1208, the process 1200 includes the system determining that a first settlement and a second settlement are assigned to a same zoom level. For example, the system may determine a first settlement and a second settlement to be displayed within the area of the map are assigned to a same zoom level.

At block 1210, the process 1200 includes the system determining that the second settlement is within a de-densify distance of the first settlement.

At block 1212, the process 1200 includes the system comparing a first score for the first settlement and a second score for the second settlement. In some embodiments, the first score may be pre-defined to be a high score for display at the zoom level.

At block 1214, the process 1200 includes the system demoting one of the first settlement or the second settlement. For example, the system may demote one of the first settlement or the second settlement to another zoom level based on the comparison of the first score and the second score.

At block 1216, the process 1200 includes the system may determine a number of labels for display based on the zoom level. For example, the system may determine a number of labels for display based on the zoom level for display of the area of the map determined in block 1202. Determining the number of labels may include determining a density factor for the labels and determining a base number of labels. The number of labels for display may be determined based at least in part on the density factor, the base number of labels, and the zoom level for display of the area of the map.

At block 1218, the process 1200 includes the system determining labels for a portion of the one or more settlements to be displayed within the area of the map. For example, the system may determine labels for a portion of the one or more settlements to be displayed within the area of the map based at least in part on the zoom level for the display and the zoom levels for each of the one or more settlements. In some embodiments, the portion of the labels for the one or more settlements is determined based on the number of labels for display.

At block 1220, the process 1200 includes the system causing the area of the map to be displayed. For example, the system may cause the area of the map to be displayed with the portion of the labels for the one or more settlements determined in block 1218.

While the process 1200 is described in a particular order and with particular elements, it should be understood that the order may be different in other embodiments, and/or may have one or more of the elements omitted in other embodiments. Further, one or more of the elements in the process 1200 may be performed concurrently in other embodiments.

Figure 14:
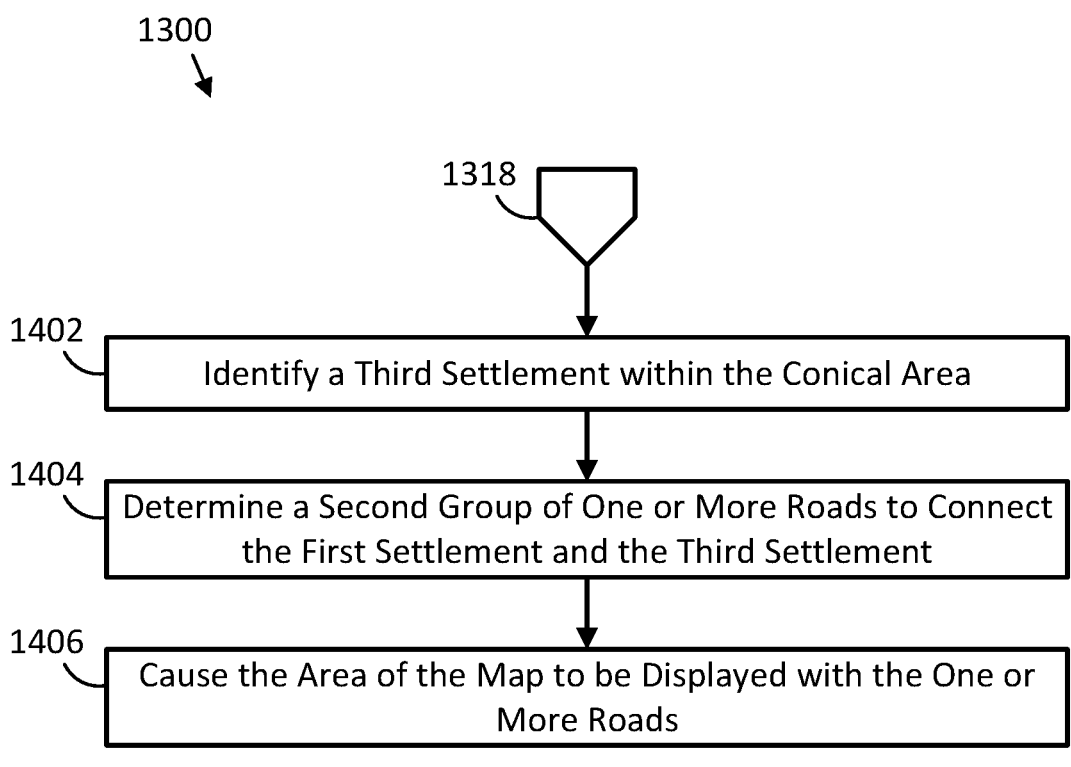
FIG. 14 illustrates a second portion of the process of FIG. 13 in accordance with some embodiments.

FIG. 13 illustrates a first portion of a process 1300 for determining roads to be displayed in a map in accordance with some embodiments. FIG. 14 illustrates a second portion of the process 1300 of FIG. 13 in accordance with some embodiments. The process 1300 may be performed by a system and/or a device as described throughout this disclosure. For brevity, the process 1300 is described as being performed by a system herein.

At block 1302, the process 1300 includes the system determining a zoom level for display of an area of a map. For example, the system may determine the zoom level for display of an area of a map based at least on part on a request for display of the map.

At block 1304, the process 1300 includes the system determining a first settlement and a second settlement to be displayed with labels within the area of the map. In some embodiments, determining the first settlement and the second settlement may include selecting the first settlement. Further, determine the settlements may include determining the second settlement is a closest settlement to the first settlement to be displayed at the zoom level for the display of the area of the map.

At block 1306, the process 1300 includes the system determining one or more roads to connect the first settlement and the second settlement. For example, the system may determine the one or more roads to connect the first settlement and the second settlement based at least in part on the zoom level determined in block 1302. In some embodiments, the one or more roads may be determined to connect the first settlement and the second settlement based at least in part on the second settlement being the closest settlement to the first settlement to be displayed at the zoom level for display of the area of the map.

In some embodiments, determining the one or more roads may include determining one or more predefined roads for the zoom level that extend solely or in combination between the first settlement and the second settlement. Further, determining the one or more roads may include determining that the one or more predefined roads do not extend within a proximity of the first settlement and the second settlement. One or more additional roads may be determined to add to the predefined roads to cause the one or more predefined roads and the additional roads to connect the first settlement and the second settlement within the proximity of the first settlement and the second settlement. The one or more additional roads may have zoom levels equal to or lower than the zoom level for the display of the area of the map.

In some embodiments, determining the one or more roads may include determining the one or more roads based at least on the one or more roads having corresponding zoom levels equal to or lower than the zoom level for the display of the area of the map. Further, determining the one or more roads may include determining that the one or more roads do not extend within a proximity of the first settlement. Determining the one or more roads may include determining a closest point to the first settlement that the one or more roads extend and generating a fake settlement for the display of the area of the map at the closets point to the first settlement. The one or more roads may connect to the fake settlement.

In some embodiments, determining the one or more roads may include determining one or more road segments form a road of the one or more roads based at least in part on geometries of the one or more road segments, names of the one or more road segments, classifications of the one or more road segments, regions of the one or more road segments, countries of the one or more road segments, or zip codes of the one or more road segments.

At block 1308, the process 1300 includes the system determining a portion of the one or more roads extend outside of a route. For example, the system may determine a portion of the one or more roads extend outside of a route between the first settlement and the second settlement.

At block 1310, the process 1300 includes the system causing the portion of the one or more roads to not be displayed within the area. For example, the system may cause the portion of the one or more roads determined in block 1308 to not be displayed within the area.

At block 1312, the process 1300 includes the system determining a radius from the first settlement to the second settlement.

At block 1314, the process 1300 includes the system determining a conical area. For example, the system may determine a conical area extending from the first settlement and bisected by the radius determined in block 1312. In some embodiments, an angle of the conical area may be determined based at least in part on the zoom level. In some embodiments, the conical area may be rotated from the radius by a non-zero angle.

At block 1316, the process 1300 includes the system avoiding display of additional roads to connect the first settlement to other settlements. For example, the system may avoid display of additional roads to connect the first settlement to other settlement within the conical area. The additional roads may different roads than the one or more roads determine in block 1306.

Block 1318 of FIG. 13 may proceed to block 1318 of FIG. 14. In particular, the process 1300 may proceed from block 1316 of FIG. 13 to block 1402 of FIG. 14

At block 1402, the process 1300 includes the system identifying a third settlement within the conical area. For example, the system may identify a third settlement within the conical area rotated from the radius by a non-zero angle.

At block 1404, the process 1300 includes the system determining a second group of one or more roads to connect the first settlement and the third settlement. For example, the system may determine a second group of one or more roads to connect the first settlement and the third settlement based at least in part on the zoom level.

At block 1406, the process 1300 includes the system causing the area of the map to be displayed with the one or more roads. For example, the system may cause the area of the map to be displayed with the one or more roads connecting the first settlement and the second settlement. In some embodiments, causing the cause of the map to be displayed further causes the area of the map to be displayed with the second group of one or more roads connecting the first settlement and the third settlement.

While the process 1300 is described in a particular order and with particular elements, it should be understood that the order may be different in other embodiments, and/or may have one or more of the elements omitted in other embodiments. Further, one or more of the elements in the process 1300 may be performed concurrently in other embodiments.

FIG. 15 illustrates a first portion of an example process 1500 in accordance with some embodiments. FIG. 16 illustrates a second portion of the example process 1500 of FIG. 15 in accordance with some embodiments. The process 1500 may be performed by a system and/or a device as described throughout this disclosure. For brevity, the process 1500 is described as being performed by a system herein.

At block 1502, the process 1500 includes the system determining a first settlement displayed at a first zoom level. For example, the system may determine a first settlement displayed at a first zoom level of a display of an area of a map. In some embodiments, the area of the map may be a first area of the map corresponding to a first zoom level. In some embodiments, the first settlement may be determined based at least in part on curation information.

At block 1504, the process 1500 includes the system determining a change from the first zoom level to a second zoom level. For example, the system may determine a change from a first zoom level to a second zoom level, the second zoom level being a higher zoom level than the first zoom level.

At block 1506, the process 1500 includes the system determining settlement candidates for display at the second zoom level. For example, the system may determine settlement candidates for the display at the second zoom level that do not have labels displayed at the first zoom level based at least in part on populations of the settlement candidates or search popularity scores for the settlement candidates.

At block 1508, the process 1500 includes the system determining a second settlement from the settlement candidates. For example, the system may determine the second settlement from the settlement candidates, the second settlement located within a proximity of the first settlement. In some embodiments, the proximity may be a first proximity.

At block 1510, the process 1500 includes the system determining a third settlement. For example, the system may determine a third settlement from the settlement candidates. In some embodiments, the third settlement may be located within the first proximity of the first settlement and a second proximity of the second settlement. In some embodiments, the third settlement may be located outside of the proximity of the first settlement and within a second area of the map corresponding to the second zoom level.

At block 1512, the process 1500 includes the system determining a score corresponding to the second settlement is greater than a score corresponding to the third settlement. For example, the system may determine that a first score corresponding to the second settlement is greater than a second score corresponding to the third settlement. The first score may be based at least in part on a population of the second settlement or a search popularity score of the second settlement and the second score may be based at least in part on a population of the third settlement or a search popularity score of the third settlement.

At block 1514, the process 1500 includes the system may determine that a second label corresponding to the second settlement is to be displayed at the second zoom level and a third label corresponding to the third settlement is not to be displayed at the second zoom level. For example, the system may determine that the second label corresponding to the second settlement is to be displayed at the second zoom level and the third label corresponding to the third settlement is not to be displayed at the second zoom level based at least in part on the first score being greater than the second score. This may occur when the third settlement is located within the first proximity of the first settlement and the second proximity of the second settlement.

At block 1516, the process 1500 includes the system determining a fourth settlement. For example, the system may determine a fourth settlement from the settlement candidates. The fourth settlement may be located outside of the first proximity of the first settlement, within a second area of the map corresponding to the second zoom level, and within a second proximity of the third settlement.

At block 1518, the process 1500 includes the system determining a score corresponding to the third settlement is greater than a score corresponding to the fourth settlement. For example, the system may determine that a first score corresponding to the third settlement is greater than a second score corresponding to the fourth settlement. The first score may be based at least in part on a population of the third settlement or a search popularity score of the third settlement and the second score may be based at least in part on a population of the fourth settlement or a search popularity score of the fourth settlement.

Block 1520 of FIG. 15 may proceed to block 1520 of FIG. 16. In particular, the process 1500 may proceed from block 1518 of FIG. 15 to block 1602 of FIG. 16.

At block 1602, the process 1500 includes the system determining that a third label corresponding to the third settlement is to be displayed at the second zoom level and a fourth label corresponding to the fourth settlement is not to be displayed at the second zoom level. For example, the system may determine that the third label corresponding to the third settlement is to be displayed at the second zoom level and a fourth label corresponding to the fourth settlement is not to be displayed at the second zoom level based at least in part on the first score corresponding to the third settlement being greater than the second score corresponding to the fourth settlement. This may occur when the third settlement is located outside of the proximity of the first settlement and within a second area of the map corresponding to the second zoom level.

At block 1604, the process 1500 includes the system causing a second label corresponding to the second settlement to be displayed at the second zoom level. For example, the system may cause a second label corresponding to the second settlement to be displayed at the second zoom level based at least in part on the second settlement being located within the proximity of the first settlement.

At block 1606, the process 1500 includes the system causing a third label corresponding to the third settlement to be displayed at the second zoom level. For example, the system may cause a third label corresponding to the third settlement to be displayed at the second zoom level based at least in part on the third settlement being located outside of the proximity of the first settlement and within a second area of the map corresponding to the second zoom level.

While the process 1500 is described in a particular order and with particular elements, it should be understood that the order may be different in other embodiments, and/or may have one or more of the elements omitted in other embodiments. Further, one or more of the elements in the process 1500 may be performed concurrently in other embodiments.

Figure 17:
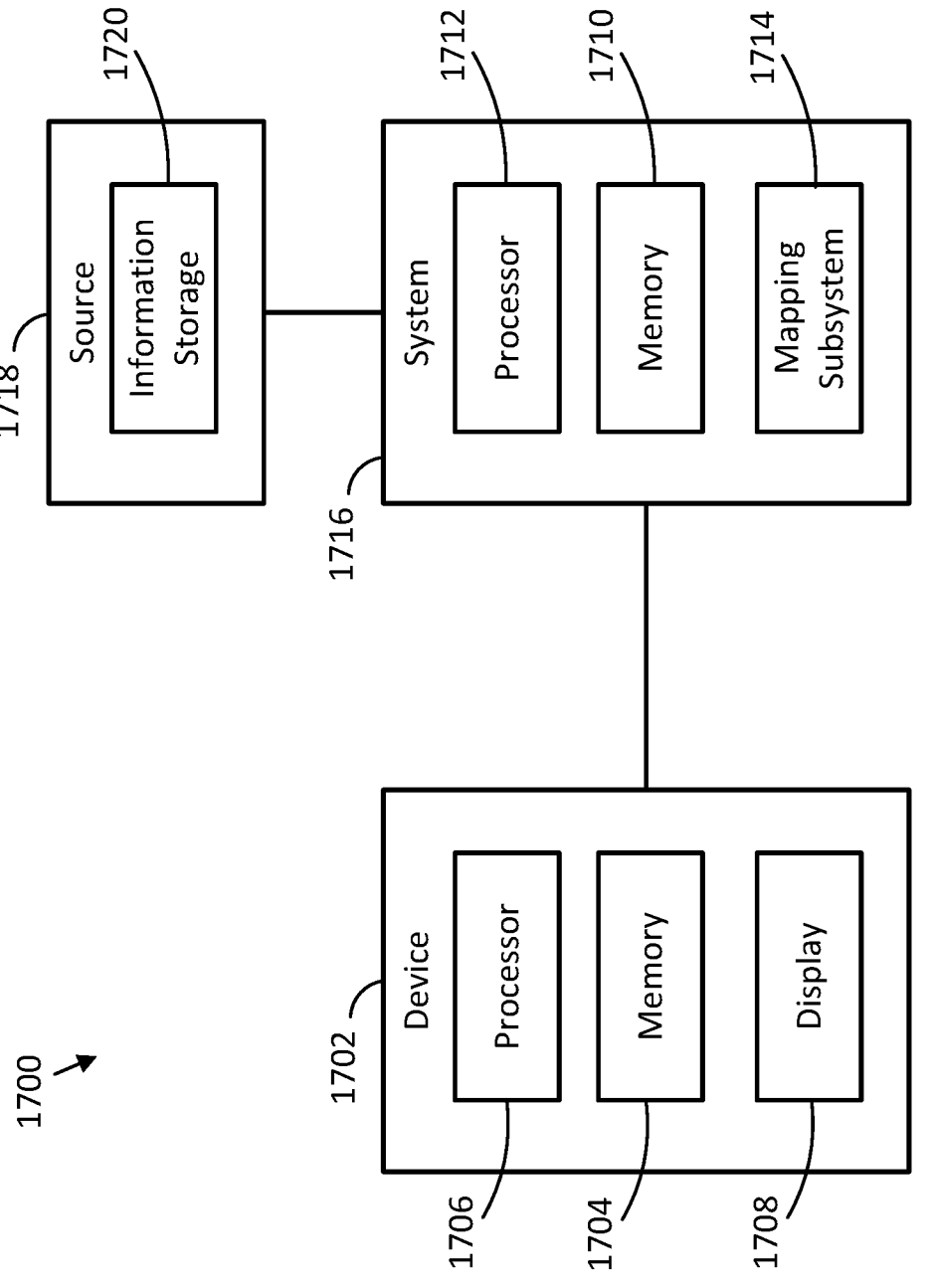
FIG. 17 illustrates an example system arrangement in accordance with some embodiments.

FIG. 17 illustrates an example system arrangement 1700 in accordance with some embodiments. In particular, the system arrangement 1700 illustrates elements that may perform one or more of the processes and/or operations described throughout this disclosure, including the process 100 (FIG. 1), the process 300 (FIG. 3), the process 700 (FIG. 7), the process 900 (FIG. 9), the process 1200 (FIG. 12), the process 1300 (FIG. 13), and/or the process 1500 (FIG.

The system arrangement 1700 may include a device 1702. The device 1702 may be a device that can display a map for viewing by a user, such as a computing device (which can include a smart phone, a computer, a device implemented in a vehicle, a smart television, an Apple television (e.g., a set-top box), a voice controlled device, a smart device, etc.). For example, the user may request a display of a map on the device 1702. The request may include an indication of an area to be displayed within the map and/or a zoom level for the map display. The device 1702 may include a memory 1704 and a processor 1706. The memory 1704 may store computer code (which can be referred to as instructions) that can receive the request and interpret the information from the request. Further, the memory 1704 may store computer code that can cause the device 1702 to display a map. The processor 1706 may execute the computer code to cause the device 1702 to perform one or more of the operations defined by the computer code. The device 1702 may further include a display 1708 on which the device 1702 may display the map.

The system arrangement 1700 may include a system 1716. The system 1716 may include a memory 1710 and a processor 1712. The memory 1710 may store computer code (which can be referred to as instructions) that can be performed by the processor 1712 to perform one or more operations. The system 1716 may further include a mapping subsystem 1714 that can perform one or more processes and/or operations described throughout the disclosure. The mapping subsystem 1714 may include one or more processors and/or computer code that can be executed to perform the one or more processes and/or operations described throughout the disclosure. In some embodiments, the computer code of the mapping subsystem 1714 may be executed by the processor 1712 to perform the one or more processes and/or operations, and/or the computer code described in relation to the mapping subsystem 1714 may be stored in the memory 1710 rather than the mapping subsystem.

The device 1702 may generate a request for information to be displayed within a map display to be displayed on the display 1708 of the device 1702. The request may include information about the map display, such as the area to be displayed, the zoom level for the map display, and/or information collected by the device 1702 related to the map display. The device 1702 may provide the request to the system 1716. The system 1716 may receive the request and perform one or more of the processes and/or operations described herein to determine information (such as settlements, labels for settlements, road and/or road segments, or some combination thereof) to be displayed within the map display.

The system arrangement 1700 may include one or more sources, such as the source 1718. The source 1718 may comprise a server or other computing device. The source 1718 may include information storage 1720. The information storage 1720 may store information that may be utilized for generating a map, such as location information for settlements, parameters for settlements, labels for settlements, location information for roads and/or road segments, parameters for roads and/or road segments, labels for roads and/or road segments, and/or other information described throughout this disclosure that may be utilized for determining settlements, labels, roads, and/or road segments to be displayed in a map.

Based on the reception of the request received from the device 1702, the system 1716 may retrieve information from one or more of the sources, such as the sources 1718. Based on the information received from the sources, the system 1716 may perform one or more of the processes and/or operations described throughout this disclosure. For example, the system 1716 may determine settlements, labels, roads, and/or road segments to be displayed in the map. The system 1716 may provide an indication of information (including the determined settlements, labels, roads, and/or road segments) to be included in the map display to the device 1702. The device 1702 may display the map on the display 1708 based on the indication of the information from the system 1716.

While a certain arrangement of elements is described in the system arrangement 1700, it should be understood that differences may exist in other embodiments. For example, the mapping subsystem 1714 may be located within the device 1702 in some embodiments, where the device 1702 may perform the one or more processes and/or operations described throughout the disclosure, the system 1716 may be omitted, the sources (including the source 1718) may be coupled to the device 1702, and the device 1702 may retrieve the information from the sources. In other embodiments, the information storage 1720 may be located within the device 1702 and/or the system 1716 and the source 1718 may be omitted.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hard-ware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "zoomed in" or "zoom in" may refer to the scale of the display of a map being increased, such that a geographical area displayed by the map is represented by a greater area of the map when zoomed in as compared to the display of the map before being zoomed in. Further, the term "zoomed out" or "zoom out" may refer to the scale of the display of a map being decreased, such that a geographical area displayed by the map is represented by a smaller area of the map when zoomed out as compared to the display of the map before being zoomed out. As a non-limiting example, a map may be originally displayed with a scale of 2 miles of geographical distance corresponding to 1 inch on the display of the map. When zoomed in from the original display, the scale of the map may be changed to 1 mile of geographical distance corresponding to 1 inch on the display of the map. When zoomed out from the original display, the scale of the map may be changed to 4 miles of geographical distance corresponding to 1 inch on the display of the map.

The term "zoom level" may indicate a corresponding scale of a display of a map. For example, zoom level 11 may correspond to a certain scale of a display of a map, while zoom level 10 may correspond to a different scale of the display of the map. Lower numbered zoom levels may indicate lower scales as compared to higher numbered zoom levels.

The term "settlement" may indicate a city, a neighborhood, or another geographical grouping of structures. For example, the settlements referred to throughout the disclosure may be cities or neighborhoods in some of the embodiments.

As described above, one aspect of the present technology is the gathering and use of data available from specific and legitimate sources for determining information to be displayed with in a map. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and processes. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

EXAMPLES

In the following sections, further exemplary embodiments are provided.

Example 1 may include a computer-implemented method, comprising determining, by a system, a zoom level for display of an area of a map, identifying, by the system, one or more settlements represented within the area of the map, determining, by the system, zoom levels for each of the one or more settlements based at least in part on settlement properties associated with the one or more settlements, determining, by the system, labels for a portion of the one or more settlements to be displayed within the area of the map based at least in part on the zoom level for the display and the zoom levels for each of the one or more settlements, and causing, by the system, the area of the map to be displayed with the labels for the portion of the one or more settlements.

Example 2 may include the method of example 1, wherein determining the zoom levels for each of the one or more settlements comprises determining cities from the one or more settlements, and determining zoom levels for the cities based at least in part on geo-search popularities for the cities, and at least one of populations of the cities or curation information for the cities.

Example 3 may include the method of example 2, wherein determining the zoom levels for the cities comprises determining a first weighting for the geo-search popularities for the cities, and at least one weighting corresponding to the at least one of the populations of the cities or the curation information for the cities, wherein the first weighting and the at least one weighting are predefined, applying the first weighting to the geo-search popularities and applying the at least one weighting to the at least one of the populations of the cities or the curation information for the cities to generate scores for each of the cities, and determining the zoom levels for the cities based at least in part on the scores.

Example 4 may include the method of example 1, wherein determining the zoom levels for each of the one or more settlements comprises determining neighborhoods from the one or more settlements, and determining zoom levels for the neighborhoods based at least in part on geo-search popularities for the neighborhoods, and at least one of neighborhood areas for the neighborhoods, user device position traces for the neighborhoods, numbers of address points for the neighborhoods, or numbers of points of interests for the neighborhoods.

Example 5 may include the method of example 4, wherein determining the zoom levels for the neighborhoods comprises determining a first weighting for the geo-search popularities for the neighborhoods, and at least one weighting corresponding to the at least one of the neighborhood areas, the user device position traces, the numbers of address points, or the numbers of points of interests, wherein the first weighting and the at least one weighing are predefined, applying the first weighting to the geo-search popularities for the neighborhoods and applying the at least one weighting to the at least one of the neighborhood areas, the user device position traces, the numbers of address points, or the numbers of points of interests to generate scores for each of the neighborhoods, and determining the zoom levels for the neighborhoods based at least in part on the scores.

Example 6 may include the method of example 1, further comprising determining, by the system, a number of labels for display based on the zoom level, wherein the labels for the portion of the one or more settlements are determined based on the number of labels for display.

Example 7 may include the method of example 6, wherein determining the number of labels for display comprises determining a density factor for the labels, and determining a base number of labels, wherein the numbers of labels for display are determined based at least in part on the density factor, the base number of labels, and the zoom level for display of the area of the map.

Example 8 may include the method of example 1, wherein determining the zoom levels for each of the one or more settlements comprises dividing the one or more settlements into two or more clusters, wherein each of the two or more clusters comprises portions of the one or more settlements, and normalizing the two or more clusters, wherein the zoom levels for each of the one or more settlements are based at least in part on the normalized two or more clusters.

Example 9 may include the method of example 1, wherein the one or more settlements represented within the area of the map comprise a first settlement and a second settlement, and wherein the method further comprises determining, by the system, that the first settlement and the second settlement are assigned a same zoom level, determining, by the system, that the second settlement is within a de-densify distance of the first settlement, comparing, by the system, a first score for the first settlement and a second score for the second settlement, and demoting, by the system, one of the first settlement or the second settlement to another zoom level based on comparing the first score and the second score.

Example 10 may include the method of example 9, wherein the first score is pre-defined to be a high score for display at the zoom level.

Example 11 may include the method of example 1, wherein the one or more settlements comprise one or more cities or one or more neighborhoods.

Example 12 may include the method of example 1, wherein the settlement properties include a geo-search popularity property, an area property, a user device position trace property, a number of address points property, or a number of points of interest property.

Example 13 may include the method of example 1, wherein the settlement properties are associated with user device activity data in the one or more settlements.

Example 14 may include one or more non-transitory computer-readable media comprising computer-executable instructions that, when executed by one or more processors, cause the one or more processors to perform the method of any one of examples 1-13.

Example 15 may include a computerized system, comprising a memory configured to store computer-executable instructions, and a processor configured to access the memory and execute the computer-executable instructions to perform the method of any one of examples 1-13.

Example 16 may include a computer-implemented method, comprising determining, by a system, a zoom level for display of an area of a map, determining, by the system, a first settlement and a second settlement to be displayed with labels within the area of the map, determining, by the system, one or more roads to connect the first settlement and the second settlement based at least in part on the zoom level, and causing, by the system, the area of the map to be displayed with the one or more roads connecting the first settlement and the second settlement.

Example 17 may include the method of example 16, wherein determining the one or more roads comprises determining one or more predefined roads for the zoom level that extended solely or in combination between the first settlement and the second settlement.

Example 18 may include the method of example 17, wherein determining the one or more roads further comprises determining that the one or more predefined roads do not extend within a proximity of the first settlement and the second settlement, and determining one or more additional roads to add to the predefined roads to cause the one or more predefined roads and the additional roads to connect the first settlement and the second settlement within the proximity of the first settlement and the second settlement, wherein the one or more additional roads have zoom levels equal to or lower than the zoom level for the display of the area of the map.

Example 19 may include the method of example 16, wherein determining the one or more roads comprises determining the one or more roads based at least on the one or more roads having corresponding zoom levels equal to or lower than the zoom level for the display of the area of the map.

Example 20 may include the method of example 19, wherein determining the one or more roads further comprises determining that the one or more roads do not extend within a proximity of the first settlement, determining a closest point to the first settlement that the one or more roads extend, and generating a fake settlement for the display of the area of the map at the closest point to the first settlement, wherein the one or more roads connect to the fake settlement.

Example 21 may include the method of example 16, further comprising determining a portion of the one or more roads extend outside of a route between the first settlement and the second settlement, and causing the portion of the one or more roads not be displayed within the area of the map.

Example 22 may include the method of example 16, wherein determining the one or more roads comprises determining one or more road segments form a road of the one or more roads based at least in part on geometries of the one or more road segments, names of the one or more road segments, classifications of the one or more road segments, regions of the one or more road segments, countries of the one or more road segments, or zip codes of the one or more road segments.

Example 23 may include the method of example 16, wherein determining the first settlement and the second settlement comprises selecting the first settlement, and determining that the second settlement is a closest settlement to first settlement to be displayed at the zoom level for the display of the area of the map, wherein the one or more roads are determined to connect the first settlement and the second settlement based at least in part on the second settlement being the closest settlement to the first settlement to be displayed at the zoom level for display of the area of the map.

Example 24 may include the method of example 23, further comprising determining, by the system, a radius from the first settlement to the second settlement, determining, by the system, a conical area extending from the first settlement and bisected by the radius, and avoiding, by the system, display of additional roads to connect the first settlement to other settlements within the conical area, the additional roads being different roads than the one or more roads.

Example 25 may include the method of example 24, wherein an angle of the conical area is determined based at least in part on the zoom level.

Example 26 may include the method of example 23, wherein the one or more roads is a first group of one or more roads, and wherein the method further comprises determining, by the system, a radius from the first settlement to the second settlement, determining, by the system, a conical area extending from the first settlement, the conical area rotated from the radius by a non-zero angle, identifying, by the system, a third settlement within the conical area, and determining, by the system, a second group of one or more roads to connect the first settlement and the third settlement based at least in part on the zoom level, wherein causing the area of the map to be displayed further comprises causing the area of the map to be displayed with the second group of one or more roads connecting the first settlement and the third settlement.

Example 27 may include the method of example 16, wherein the first settlement comprises a first city or a first neighborhood, and wherein the second settlement comprises a second city or a second neighborhood.

Example 28 may include one or more non-transitory computer-readable media comprising computer-executable instructions that, when executed by one or more processors, cause the one or more processors to perform the method of any one of examples 16-27.

Example 29 may include a computerized system, comprising a memory configured to store computer-executable instructions, and a processor configured to access the memory and execute the computer-executable instructions to perform the method of any one of examples 16-27.

Example 30 may include a computer-implemented method, comprising determining, by a system, a first settlement having a corresponding first label displayed at a first zoom level of a display of an area of a map, determining, by the system, a change from the first zoom level to a second zoom level, the second zoom level being a higher zoom level than the first zoom level, determining, by the system, settlement candidates for the display at the second zoom level that do not have labels displayed at the first zoom level based at least in part on populations of the settlement candidates or search popularity scores for the settlement candidates, determining, by the system, a second settlement from the settlement candidates, the second settlement located within a proximity of the first settlement, and causing, by the system, a second label corresponding to the second settlement to be displayed at the second zoom level based at least in part on the second settlement being located within the proximity of the first settlement.

Example 31 may include the method of example 30, wherein the proximity is a first proximity, and wherein the method further comprises determining, by the system, a third settlement from the settlement candidates, the third settlement located within the first proximity of the first settlement and a second proximity of the second settlement, determining, by the system, that a first score corresponding to the second settlement is greater than a second score corresponding to the third settlement, the first score based at least in part on a population of the second settlement or a search popularity score of the second settlement and the second score based at least in part on a population of the third settlement or a search popularity score of the third settlement, and determining, by the system, that the second label corresponding to the second settlement is to be displayed at the second zoom level and a third label corresponding to the third settlement is not to be displayed at the second zoom level based at least in part on the first score being greater than the second score.

Example 32 may include the method of example 30, wherein the area of the map is a first area of the map corresponding to the first zoom level, and wherein the method further comprises determining, by the system, a third settlement from the settlement candidates, the third settlement located outside of the proximity of the first settlement and within a second area of the map corresponding to the second zoom level, and causing, by the system, a third label corresponding to the third settlement to be displayed at the second zoom level based at least in part on the third settlement being located outside of the proximity of the first settlement and within a second area of the map corresponding to the second zoom level.

Example 33 may include the method of example 32, wherein the proximity is a first proximity, and wherein the method further comprises determining, by the system, a fourth settlement from the settlement candidates, the fourth settlement located outside of the first proximity of the first settlement, within a second area of the map corresponding to the second zoom level, and within a second proximity of the third settlement, determining, by the system, that a first score corresponding to the third settlement is greater than a second score corresponding to the fourth settlement, the first score based at least in part on a population of the third settlement or a search popularity score of the third settlement and the second score based at least in part on a population of the fourth settlement or a search popularity score of the fourth settlement, and determining, by the system, that the third label corresponding to the third settlement is to be displayed at the second zoom level and a fourth label corresponding to the fourth settlement is not to be displayed at the second zoom level based at least in part on the first score being greater than the second score.

Example 34 may include the method of example 30, wherein the first settlement is determined based at least in part on curation information.

Example 35 may include the method of example 30, wherein the first settlement comprises a first city or a first neighborhood, and wherein the second settlement comprises a second city or a second neighborhood.

Example 36 may include one or more non-transitory computer-readable media comprising computer-executable instructions that, when executed by one or more processors, cause the one or more processors to perform the method of any one of examples 30-35.

Example 37 may include a computerized system, comprising a memory configured to computer-executable instructions, and a processor configured to access the memory and execute the computer-executable instructions to perform the method of any one of examples 30-35.

Example 38 may include an apparatus comprising means to perform one or more elements of a method described in or related to any of examples 1-37, or any other method or process described herein.

Example 39 may include one or more non-transitory computer-readable media comprising instructions to cause an electronic device, upon execution of the instructions by one or more processors of the electronic device, to perform one or more elements of a method described in or related to any of examples 1-37, or any other method or process described herein.

Example 40 may include an apparatus comprising logic, modules, or circuitry to perform one or more elements of a method described in or related to any of examples 1-37, or any other method or process described herein.

Example 41 may include a method, technique, or process as described in or related to any of examples 1-37, or portions or parts thereof.

Example 42 may include an apparatus comprising: one or more processors and one or more computer-readable media comprising instructions that, when executed by the one or more processors, cause the one or more processors to perform the method, techniques, or process as described in or related to any of examples 1-37, or portions thereof.

Example 43 may include a signal as described in or related to any of examples 1-37, or portions or parts thereof.

Example 44 may include a datagram, information element, packet, frame, segment, PDU, or message as described in or related to any of examples 1-37, or portions or parts thereof, or otherwise described in the present disclosure.

Example 45 may include a signal encoded with data as described in or related to any of examples 1-37, or portions or parts thereof, or otherwise described in the present disclosure.

Example 46 may include a signal encoded with a datagram, IE, packet, frame, segment, PDU, or message as described in or related to any of examples 1-37, or portions or parts thereof, or otherwise described in the present disclosure.

Example 47 may include an electromagnetic signal carrying computer-readable instructions, wherein execution of the computer-readable instructions by one or more processors is to cause the one or more processors to perform the method, techniques, or process as described in or related to any of examples 1-37, or portions thereof.

Example 48 may include a computer program comprising instructions, wherein execution of the program by a processing element is to cause the processing element to carry out the method, techniques, or process as described in or related to any of examples 1-37, or portions thereof.

Example 49 may include a signal in a wireless network as shown and described herein.

Example 50 may include a method of communicating in a wireless network as shown and described herein.

Example 51 may include a system for providing wireless communication as shown and described herein.

Example 52 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:

determining, by a system, a zoom level for display of an area of a map;

identifying, by the system, one or more settlements represented within the area of the map, wherein the one or more settlements represented within the area of the map comprise a first settlement and a second settlement;

determining, by the system, zoom levels for each of the one or more settlements based at least in part on settlement properties associated with the one or more settlements, the settlement properties including user device position traces for each of the one or more settlements, the user device position traces indicating information related to user devices located within a corresponding settlement;

determining, by the system, labels for a portion of the one or more settlements to be displayed within the area of the map based at least in part on the zoom level for the display and the zoom levels for each of the one or more settlements;

causing, by the system, the area of the map to be displayed with the labels for the portion of the one or more settlements determining, by the system, that the first settlement and the second settlement are assigned a same zoom level;

determining, by the system, that the second settlement is within a de-densify distance of the first settlement;

comparing, by the system based at least in part on the second settlement being within the de-densify distance of the first settlement, a first score for the first settlement and a second score for the second settlement; and demoting, by the system, one of the first settlement or the second settlement to another zoom level based on comparing the first score and the second score.

2. The method of claim 1, wherein determining the zoom levels for each of the one or more settlements comprises:

determining cities from the one or more settlements; and determining zoom levels for the cities based at least in part on geo-search popularities for the cities, and at least one of populations of the cities or curation information for the cities.

3. The method of claim 2, wherein determining the zoom levels for the cities comprises:

identifying a first weighting for the geo-search popularities for the cities, and at least one weighting corresponding to the at least one of the populations of the cities or the curation information for the cities, wherein the first weighting and the at least one weighting are predefined;

applying the first weighting to the geo-search popularities and applying the at least one weighting to the at least one of the populations of the cities or the curation information for the cities to generate scores for each of the cities; and determining the zoom levels for the cities based at least in part on the scores.

4. The method of claim 1, wherein determining the zoom levels for each of the one or more settlements comprises:

determining neighborhoods from the one or more settlements; and determining zoom levels for the neighborhoods based at least in part on geo-search popularities for the neighborhoods, and at least one of neighborhood areas for the neighborhoods, numbers of address points for the neighborhoods, or numbers of points of interests for the neighborhoods.

5. The method of claim 4, wherein determining the zoom levels for the neighborhoods comprises:

identifying a first weighting for the geo-search popularities for the neighborhoods, and at least one weighting corresponding to the at least one of the neighborhood areas, the user device position traces, the numbers of address points, or the numbers of points of interests, wherein the first weighting and the at least one weighting are predefined;

applying the first weighting to the geo-search popularities for the neighborhoods and applying the at least one weighting to the at least one of the neighborhood areas, the user device position traces, the numbers of address points, or the numbers of points of interests to generate scores for each of the neighborhoods; and determining the zoom levels for the neighborhoods based at least in part on the scores.

6. The method of claim 1, further comprising:

determining, by the system, a number of labels for display based on the zoom level, wherein the labels for the portion of the one or more settlements are determined based on the number of labels for display.

7. The method of claim 6, wherein determining the number of labels for display comprises:

determining a density factor for the labels; and determining a base number of labels, wherein the number of labels for display are determined based at least in part on the density factor, the base number of labels, and the zoom level for display of the area of the map.

8. The method of claim 1, wherein determining the zoom levels for each of the one or more settlements comprises:

dividing the one or more settlements into two or more clusters, wherein each of the two or more clusters comprises portions of the one or more settlements; and normalizing the two or more clusters, wherein the zoom levels for each of the one or more settlements are based at least in part on the normalized two or more clusters.

9. The method of claim 1, wherein the first score is pre-defined to be a high score for display at the zoom level.

10. One or more non-transitory computer-readable media having instructions thereon, wherein the instructions, when executed by one or more processors, cause a system to:

determine a zoom level for display of an area of a map;

identify one or more settlements represented within the area of the map;

determine zoom levels for each of the one or more settlements based at least in part on settlement properties associated with the one or more settlements, the settlement properties including user device position traces for each of the one or more settlements, the user device position traces indicating information related to user devices located within a corresponding settlement, wherein to determine the zoom levels for each of the one or more settlements comprises to:

divide the one or more settlements into two or more clusters, wherein each of the two or more clusters comprises portions of the one or more settlements; and normalize the two or more clusters, wherein the zoom levels for each of the one or more settlements are based at least in part on the normalized two or more clusters;

determine labels for a portion of the one or more settlements to be displayed within the area of the map based at least in part on the zoom level for the display and the zoom levels for each of the one or more settlements; and cause the area of the map to be displayed with the labels for the portion of the one or more settlements.

11. The one or more non-transitory computer-readable media of claim 10, wherein to determine the zoom levels for each of the one or more settlements comprises to:

determine cities from the one or more settlements; and determine zoom levels for the cities based at least in part on geo-search popularities for the cities, and at least one of populations of the cities or curation information for the cities.

12. The one or more non-transitory computer-readable media of claim 11, wherein to determine the zoom levels for the cities comprises to:

identify a first weighting for the geo-search popularities for the cities, and at least one weighting corresponding to the at least one of the populations of the cities or the curation information for the cities, wherein the first weighting and the at least one weighting are predefined;

apply the first weighting to the geo-search popularities and applying the at least one weighting to the at least one of the populations of the cities or the curation information for the cities to generate scores for each of the cities; and determine the zoom levels for the cities based at least in part on the scores.

13. The one or more non-transitory computer-readable media of claim 10, wherein the one or more settlements comprise one or more cities or one or more neighborhoods.

14. The one or more non-transitory computer-readable media of claim 10, wherein the settlement properties include a geo-search popularity property, an area property, a number of address points property, or a number of points of interest property.

15. The one or more non-transitory computer-readable media of claim 10, wherein the settlement properties are associated with user device activity data in the one or more settlements.

16. A system, comprising:

memory to store labels of one or more settlements; and one or more processors coupled to the memory, the one or more processors to:

determine a zoom level for display of an area of a map;

identify the one or more settlements represented within the area of the map;

determine zoom levels for each of the one or more settlements based at least in part on settlement properties associated with the one or more settlements, the settlement properties including user device position traces for each of the one or more settlements, the user device position traces indicating information related to user devices located within a corresponding settlement, wherein to determine the zoom levels for each of the one or more settlements comprises to:

divide the one or more settlements into two or more clusters, wherein each of the two or more clusters comprises portions of the one or more settlements; and normalize the two or more clusters, wherein the zoom levels for each of the one or more settlements are based at least in part on the normalized two or more clusters;

determine labels for a portion of the one or more settlements to be displayed within the area of the map based at least in part on the zoom level for the display and the zoom levels for each of the one or more settlements; and cause the area of the map to be displayed with the labels for the portion of the one or more settlements.

17. The system of claim 16, wherein the one or more processors are further to:

determine a number of labels for display based on the zoom level, wherein the labels for the portion of the one or more settlements are determined based on the number of labels for display.

18. The system of claim 17, wherein to determine the number of labels for display comprises to:

determine a density factor for the labels; and determine a base number of labels, wherein the numbers of labels for display are determined based at least in part on the density factor, the base number of labels, and the zoom level for display of the area of the map.

* * * * *